US012165802B2

(12) United States Patent
Arimitsu et al.

(10) Patent No.: US 12,165,802 B2
(45) Date of Patent: Dec. 10, 2024

(54) COIL DEVICE

(71) Applicant: TDK CORPORATION, Tokyo (JP)

(72) Inventors: Kazunori Arimitsu, Tokyo (JP); Nobuo Kitajima, Tokyo (JP)

(73) Assignee: TDK CORPORATION, Tokyo (JP)

(*) Notice: Subject to any disclaimer, the term of this patent is extended or adjusted under 35 U.S.C. 154(b) by 566 days.

(21) Appl. No.: 17/375,760

(22) Filed: Jul. 14, 2021

(65) Prior Publication Data

US 2022/0020528 A1 Jan. 20, 2022

(30) Foreign Application Priority Data

Jul. 15, 2020 (JP) ................................ 2020-121126
Jun. 9, 2021 (JP) ................................ 2021-096871

(51) Int. Cl.
*H01F 27/29* (2006.01)
*H01F 27/255* (2006.01)
*H01F 27/28* (2006.01)

(52) U.S. Cl.
CPC ......... *H01F 27/292* (2013.01); *H01F 27/255* (2013.01); *H01F 27/2828* (2013.01)

(58) Field of Classification Search
CPC .. H01F 27/292; H01F 27/255; H01F 27/2828; H01F 27/2852; H01F 2017/048; H01F 17/045; H01F 27/29; H01F 17/04; H01F 27/263; H01F 27/306
See application file for complete search history.

(56) References Cited

U.S. PATENT DOCUMENTS

| | | | |
|---|---|---|---|
| 8,723,629 B1 * | 5/2014 | Liu | H01F 1/14791 336/212 |
| 10,319,514 B2 | 6/2019 | Takagi et al. | |
| 11,424,070 B2 * | 8/2022 | Someya | H01F 27/34 |
| 11,521,787 B2 * | 12/2022 | Someya | H01F 27/2823 |
| 2006/0290458 A1 | 12/2006 | Sano | |
| 2010/0253456 A1 | 10/2010 | Yan et al. | |
| 2011/0005064 A1 | 1/2011 | Klesyk et al. | |
| 2013/0154780 A1 | 6/2013 | Yamada et al. | |
| 2014/0002227 A1 * | 1/2014 | Hsieh | H01F 5/003 336/200 |
| 2016/0247626 A1 * | 8/2016 | Kawarai | H01F 27/2823 |
| 2016/0351323 A1 | 12/2016 | Wakamori et al. | |

(Continued)

FOREIGN PATENT DOCUMENTS

| | | |
|---|---|---|
| CN | 1892932 A | 1/2007 |
| JP | H02-118919 U | 9/1990 |

(Continued)

OTHER PUBLICATIONS

U.S. Appl. No. 17/375,353, filed Jul. 14, 2021 in the name of Kazunori Arimitsu et al.

(Continued)

*Primary Examiner* — Mang Tin Bik Lian
(74) *Attorney, Agent, or Firm* — Oliff PLC

(57) ABSTRACT

An inductor includes: a coil; terminals connected to end portions of the coil; a first core having a columnar portion where the coil is disposed and a base portion having an upper surface where the columnar portion is formed; and a second core covering the upper surface of the base portion together with the coil. The terminals are disposed on the upper surface of the base portion.

12 Claims, 22 Drawing Sheets

(56) References Cited

U.S. PATENT DOCUMENTS

| | | | | |
|---|---|---|---|---|
| 2017/0221623 | A1* | 8/2017 | Kawarai | H01F 27/2823 |
| 2017/0229232 | A1* | 8/2017 | Takagi | H01F 27/306 |
| 2018/0174740 | A1 | 6/2018 | Muneuchi | |
| 2019/0392977 | A1* | 12/2019 | Kawarai | H01F 27/00 |
| 2020/0194161 | A1* | 6/2020 | Hu | H01F 17/04 |
| 2020/0303115 | A1 | 9/2020 | Satou | |

FOREIGN PATENT DOCUMENTS

| | | | |
|---|---|---|---|
| JP | -03-051807 | U | 5/1991 |
| JP | H08-255717 | A | 10/1996 |
| JP | H10-22137 | A | 1/1998 |
| JP | 2001-155932 | A | 6/2001 |
| JP | 2002-313631 | A | 10/2002 |
| JP | 2006-128473 | A | 5/2006 |
| JP | 2007-165779 | A | 6/2007 |
| JP | 2008-041924 | A | 2/2008 |
| JP | 2011-243703 | A | 12/2011 |
| JP | 2013-125896 | A | 6/2013 |
| JP | 2016-157751 | A | 9/2016 |
| JP | 2018-133402 | A | 8/2018 |
| JP | 2019-057722 | A | 4/2019 |
| JP | 2020-013856 | A | 1/2020 |

OTHER PUBLICATIONS

U.S. Appl. No. 17/375,370, filed Jul. 14, 2021 in the name of Kazunori Arimitsu et al.

U.S. Appl. No. 17/375,740, filed Jul. 14, 2021 in the name of Kazunori Arimitsu et al.

May 9, 2024 U.S. Office Action issued in U.S. Appl. No. 17/375,740.

Jun. 21, 2024 U.S. Office Action issued in U.S. Appl. No. 17/375,353.

Sep. 16, 2024 Non-Final Rejection received in U.S. Appl. No. 17/375,370.

Sep. 26, 2024 Notice of Allowance received in U.S. Appl. No. 17/375,353.

Sep. 30, 2024 Notice of Allowance received in U.S. Appl. No. 17/375,740.

* cited by examiner

COIL DEVICE

BACKGROUND OF THE INVENTION

1. Field of the Invention

The present invention relates to a coil device used as, for example, an inductor or the like.

2. Description of the Related Art

The coil device described in, for example, US 2011/0005064 A is known as a coil device used as an inductor or the like. The coil device described in US 2011/0005064 A has a coil, a terminal to which an end portion of the coil is connected, a first core where the coil is wound around a columnar portion, and a second core covering a part of the terminal together with the coil. In the coil device described in US 2011/0005064 A, a connecting portion of the terminal where connecting wire and mounting portions are connected is disposed in the second core, and thus the terminal can be firmly fixed to the second core via the connecting portion.

However, in the coil device described in US 2011/0005064 A, the connecting portion is disposed in the second core, and thus the volume of the second core decreases by the amount of the installation space of the connecting portion and satisfactory inductance characteristics cannot be ensured in some cases.

SUMMARY OF THE INVENTION

The present invention has been made in view of such circumstances, and an object of the present invention is to provide a coil device having satisfactory inductance characteristics.

In order to achieve the above object, a coil device according to the present invention includes:

a coil;

a terminal connected to an end portion of the coil;

a first core having a columnar portion and a base portion, a coil being disposed around the columnar portion, the base portion having an upper surface provided with the columnar portion; and a second core covering the upper surface of the base portion together with the coil, in which the terminal is disposed on the upper surface of the base portion.

In the coil device according to the present invention, the terminal is disposed on the upper surface of the base portion and the upper surface of the base portion is covered with the second core. Accordingly, a part of the terminal disposed on the base portion is covered with the first core (base portion) and the second core and the terminal is fixed to the respective cores via the part. Accordingly, in the coil device according to the present invention, there is no need to fix the terminal to the second core via the connecting portion between a connecting wire portion and a mounting portion unlike in the related art and the connecting portion can be disposed outside the second core. Accordingly, the volume of the second core can be sufficiently ensured and the coil device having satisfactory inductance characteristics can be realized. The effect of the present invention is particularly noticeable when the coil device is reduced in size or its current is increased. Accordingly, the coil device suitable for size reduction and an increase in current can be realized.

Preferably, a connecting wire portion of the terminal is disposed on the first core and the second core is disposed on the connecting wire portion. With such a configuration, the connecting wire portion can be disposed between the first core and the second core, and thus the connecting wire portion can be effectively protected from an external factor such as an external force and the occurrence of open inferiority can be prevented. In addition, by the connecting wire portion being disposed on the first core, a positional deviation of the connecting wire portion can be prevented when the second core is disposed on the connecting wire portion.

Preferably, the first core and the second core are joined on substantially the same plane. With such a configuration, a part of the terminal disposed in the second core can be pulled out to the outside of each of the cores along the joining surface of the first core and the second core and the shape of the terminal can be simplified.

Preferably, a connecting wire portion of the terminal and the coil are disposed on substantially the same plane of the base portion. With such a configuration, the terminal can be easily placed on the upper surface of the base portion together with the coil during the manufacturing and the manufacturing can be facilitated.

Preferably, the terminal is disposed on the base portion below a coil disposition surface of the base portion. With such a configuration, the disposition surface of the coil and the disposition surface of the terminal can be deviated from each other and the coil can be stably disposed above the base portion even if a part of the terminal and a part of the bottom surface of the coil are disposed so as to overlap on the upper surface of the base portion.

Preferably, a part of the terminal extends toward a opposite direction to the first core along a side surface of the second core. The second core covers the coil and so on, and thus the second core may be larger in side surface area than the first core in terms of its configuration. With the above configuration in this case, a part of the terminal is disposed over a wide range on the side surface of the second core and a solder fillet can be sufficiently formed at the part. Accordingly, the mounting strength of the coil device with respect to a substrate can be enhanced.

Preferably, a notch is formed in the terminal at least at a position where the terminal is exposed to outer sides of the first core and the second core. With such a configuration, the terminal can be easily folded along the side surface of the first core or the second core at the position where the terminal is exposed to the outside of the first core and the second core and the part beyond the folding position can be used as a solder fillet forming portion of the terminal.

Preferably, the terminal comprises a pair of first and second terminals respectively connected to end portions of the coil and a first connecting wire portion of the first terminal and a second connecting wire portion of the second terminal are disposed so as to be oriented in the same direction. With such a configuration, laser irradiation can be easily performed on the first and second connecting wire portions in a case where, for example, laser welding is performed on the first and second connecting wire portions and the manufacturing can be facilitated.

Preferably, the columnar portion is formed so as to be positionally deviated to an outer side with respect to a central portion of the base portion. With such a configuration, a space is formed in the central portion of the base portion and the terminal can be placed in the space. Accordingly, there is no need to expand the base portion to the outside in order to ensure a terminal placement space and the coil device can be reduced in size.

Preferably, the first core has an outer surface on a side opposite to a mounting surface. In this case, the mounting surface is formed on the second core. The second core covers the coil and so on as described above, and thus the second core may be larger in side surface area than the first core in terms of its configuration. However, by the second core being provided with the mounting surface, a solder fillet forming portion with a sufficient area can be formed on the second core and the mounting strength of the coil device with respect to a substrate can be enhanced.

DETAILED DESCRIPTION OF THE PREFERRED EMBODIMENTS

Figure 1:
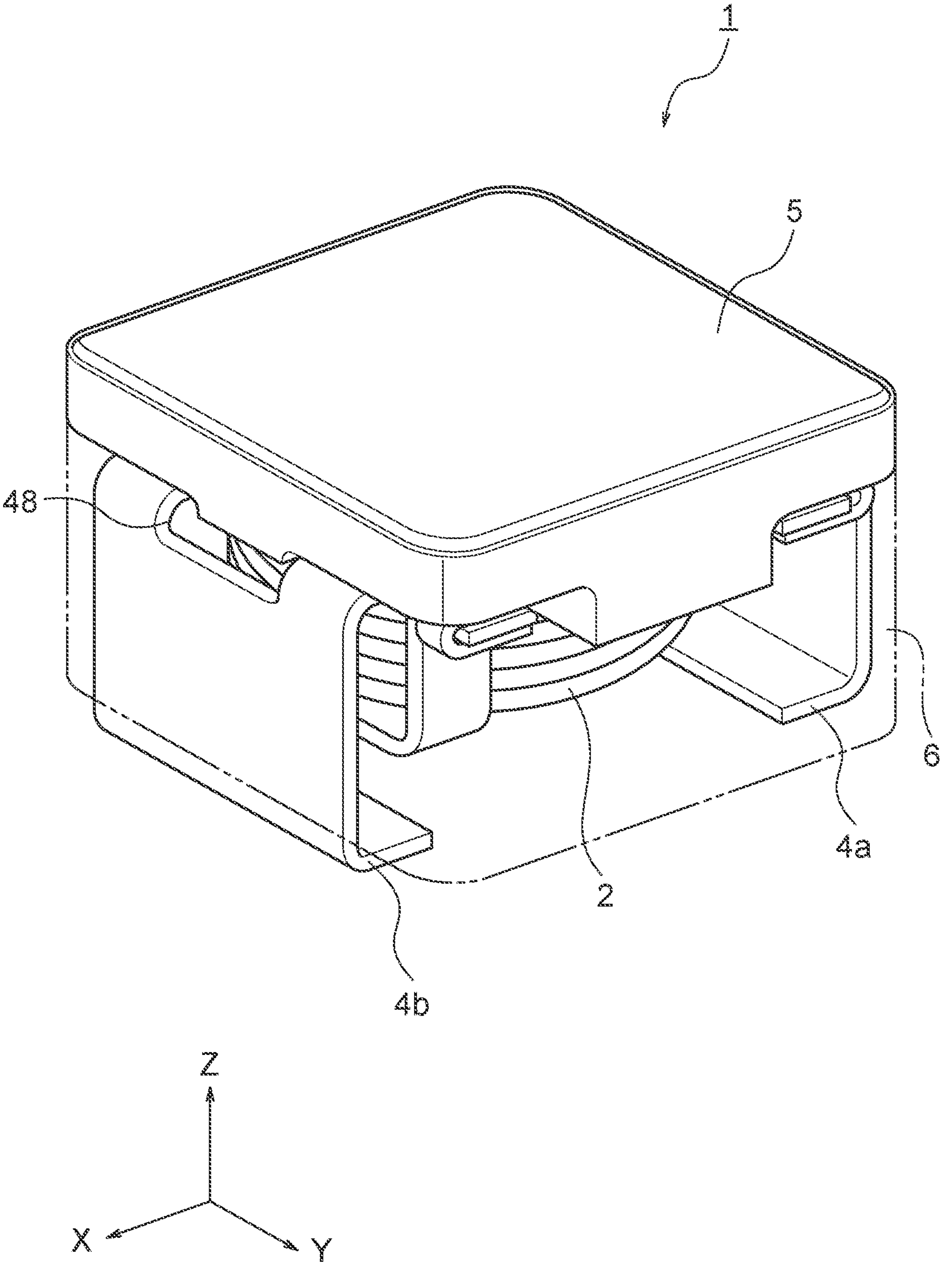
FIG. 1 is a perspective view of a coil device according to a first embodiment of the present invention.

Hereinafter, the present invention will be described based on the embodiments illustrated in the drawings.

First Embodiment

As illustrated in FIG. 1, an inductor 1 according to the first embodiment of the present invention has a substantially rectangular parallelepiped shape and has a coil 2, terminals 4*a* and 4*b*, a first core 5, and a second core 6. The inductor 1 has a shape in which the first core 5 and the second core 6 are combined in the Z-axis direction. The upper surface of the inductor 1 is formed on the first core 5 side, and the bottom surface (mounting surface) of the inductor 1 is formed on the second core 6 side. It should be noted that the second core 6 is illustrated by a virtual line for easy understanding of the internal configuration of the inductor 1. In addition, in FIGS. 2 to 6D, each of the above configurations is illustrated upside down for easy understanding.

Although the dimensions of the inductor 1 are not particularly limited, its width in the X-axis direction is preferably 2 to 20 mm, its width in the Y-axis direction is preferably 2 to 20 mm, and its width in the Z-axis direction is preferably 1 to 10 mm.

Figure 2:
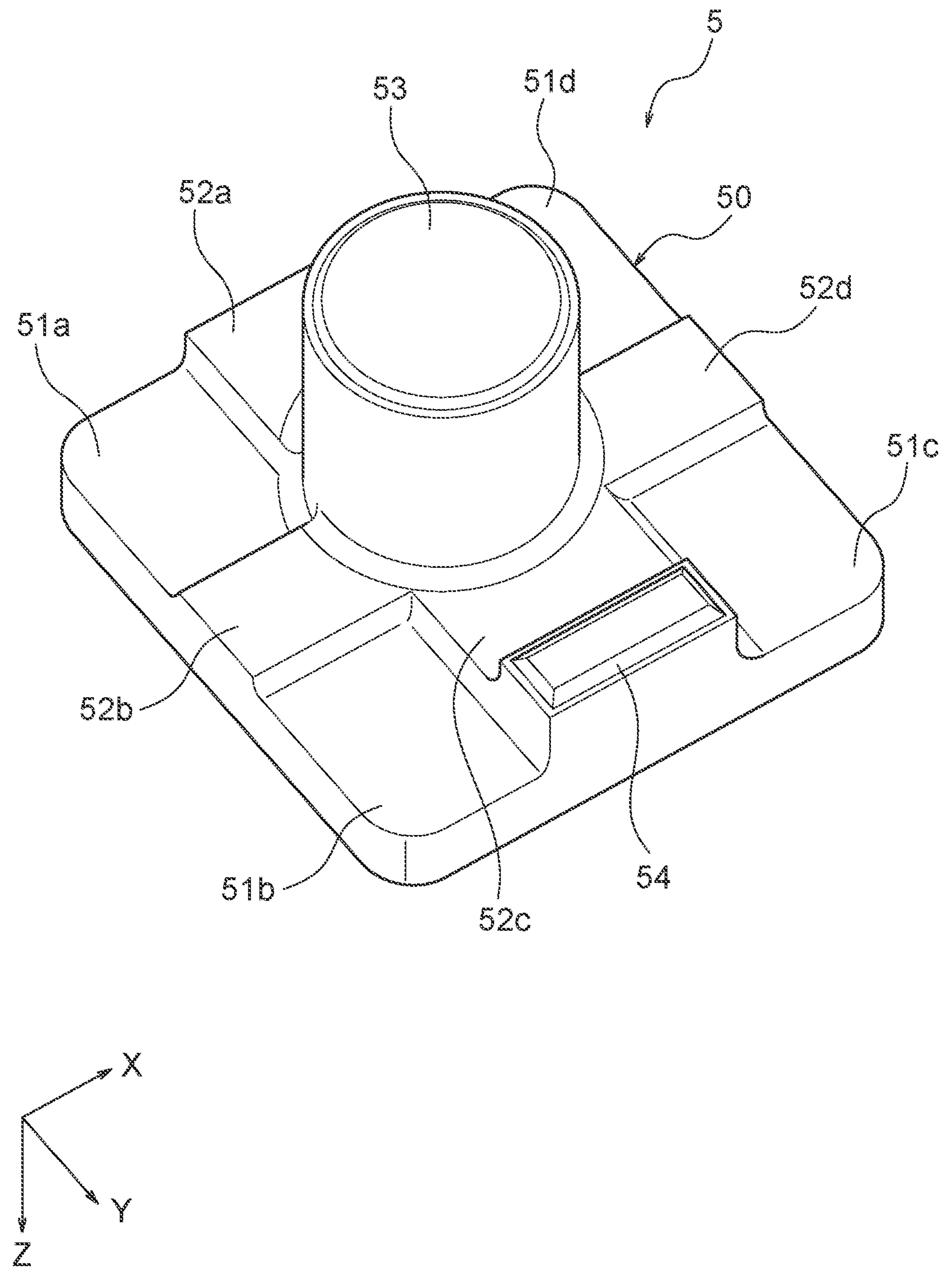
FIG. 2 is a perspective view of a first core illustrated in FIG. 1.

As illustrated in FIG. 2, the first core 5 has a base portion 50 and a columnar portion 53 formed on the surface (upper surface) of the base portion 50. It should be noted that the upper surface of the base portion 50 faces the lower part of the inductor 1 when the inductor 1 is disposed such that the mounting surface faces downward as illustrated in FIG. 1.

The first core 5 is made of a synthetic resin in which ferrite particles or metal magnetic material particles are dispersed. However, the material constituting the first core 5 is not limited thereto and the first core 5 may be made of a synthetic resin that does not contain the particles. Examples of the ferrite particles include Ni—Zn-based ferrite and Mn—Zn-based ferrite. Although the metal magnetic material particles are not particularly limited, examples thereof include Fe—Ni alloy powder, Fe—Si alloy powder, Fe—Si—Cr alloy powder, Fe—Co alloy powder, Fe—Si—Al alloy powder, and amorphous iron.

Although the synthetic resin contained in the first core 5 is not particularly limited, preferable examples thereof include epoxy resin, phenol resin, polyester resin, polyurethane resin, polyimide resin, and silicone resin.

The base portion 50 has a substantially rectangular parallelepiped shape (substantially flat shape). First to fourth recessed portions 51*a* to 51*d*, first to fourth projecting portions 52*a* to 52*d*, and a protruding portion 54 are formed on the surface (upper surface) of the base portion 50. The recessed portions 51*a* to 51*d* are respectively formed at the four corners of the base portion 50 and have a substantially rectangular shape when viewed from the Z-axis direction.

The recessed portions 51*a* to 51*d* have a predetermined depth, and the depth is substantially equal to the thickness (plate thickness) of the terminals 4*a* and 4*b* illustrated in FIG. 1. In other words, the depth of the recessed portions 51*a* to 51*d* is relatively shallow and the upper surface of the base portion 50 is a substantially flat surface. Accordingly, the first core 5 and the second core 6 are joined on substantially the same plane when the first core 5 and the second core 6 are combined as illustrated in FIG. 1.

As illustrated in FIG. 2, the projecting portions 52*a* to 52*d* have a surface shape formed of a flat surface and extend radially outward from the substantially central portion of the base portion 50 (position slightly deviated in terms of position from the center of the base portion 50). The first projecting portion 52*a* is formed between the first recessed portion 51*a* and the fourth recessed portion 51*d*, the second projecting portion 52*b* is formed between the first recessed portion 51*a* and the second recessed portion 51*b*, the third projecting portion 52*c* is formed between the second recessed portion 51*b* and the third recessed portion 51*c*, and the fourth projecting portion 52*d* is formed between the third recessed portion 51*c* and the fourth recessed portion 51*d*.

The protruding portion 54 is formed in the end portion of the third projecting portion 52*c* in the Y-axis direction. The protruding portion 54 protrudes by a predetermined height in the Z-axis direction from the upper surface of the third projecting portion 52*c*. The width of the protruding portion 54 in the X-axis direction is substantially equal to the width of the third projecting portion 52*c* in the X-axis direction. The protruding portion 54 has a substantially rectangular shape when viewed from the Z-axis direction, and a tapered surface is formed on the upper surface thereof.

As will be described later, the terminal 4*a* is disposed in the first recessed portion 51*a* and the second recessed portion 51*b* so as to straddle the second projecting portion 52*b* (see FIG. 5). The terminal 4*b* is disposed in the third recessed portion 51*c* and the fourth recessed portion 51*d* so as to straddle the fourth projecting portion 52*d* (see FIG. 5). The projecting portions 52*a* to 52*d* protrude in the Z-axis direction by the thickness of the terminals 4*a* and 4*b* with respect to the recessed portions 51*a* to 51*d*. Accordingly, when the terminals 4*a* and 4*b* are disposed in the recessed portions 51*a* to 51*d* as described above, the upper surface of the projecting portions 52*a* to 52*d* and the upper surface of the terminals 4*a* and 4*b* (a first placement portion 41 and a second placement portion 42) are substantially flush with each other.

The columnar portion 53 is integrally formed in the substantially central portion of the base portion 50 and extends in the Z-axis direction. The columnar portion 53 is formed so as to be positionally deviated slightly to the outside (negative direction side in the Y-axis direction) with respect to the central portion of the base portion 50. The coil (air core coil) 2 illustrated in FIG. 1 is disposed (inserted or wound) in the columnar portion 53. Accordingly, the diameter of the columnar portion 53 is smaller than the inner diameter of the coil 2. The columnar portion 53 has a columnar shape, and its height is higher than the height of the coil 2 (see FIG. 5). By the first core 5 being provided with the columnar portion 53, the effective magnetic permeability of the first core 5 in the region inside the coil 2 can be sufficiently ensured and the inductance characteristics of the inductor 1 can be satisfactory.

Figure 3:
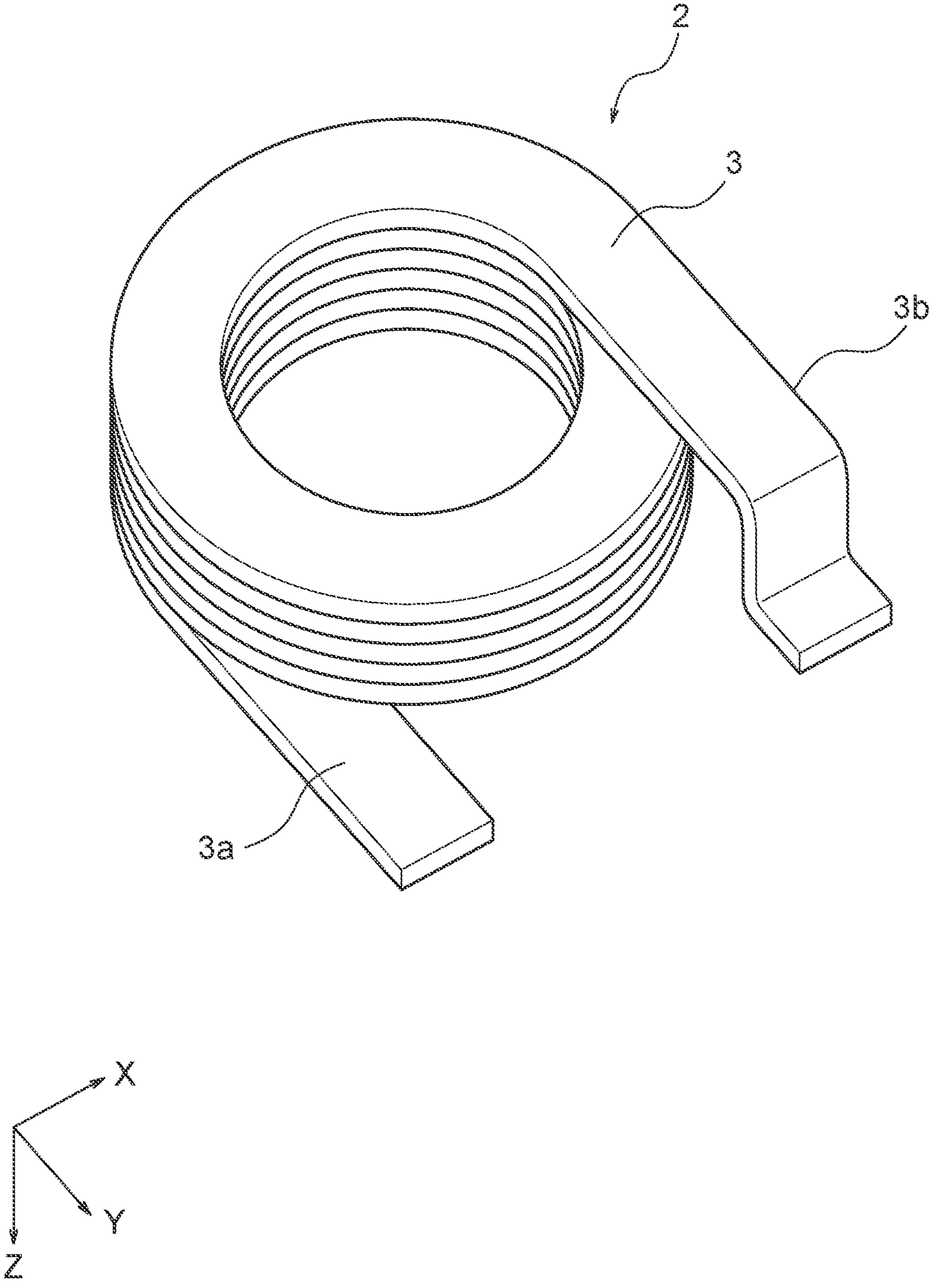
FIG. 3 is a perspective view of a coil illustrated in FIG. 1.

As illustrated in FIG. 3, an air core coil constitutes the coil 2 in which a wire 3 made of a flat wire is wound edgewise. Although the coil 2 is α-wound, the winding method is not limited thereto. The short-side surface (edge-side surface) of the wire 3 constitutes the inner peripheral surface or the outer peripheral surface of the coil 2, and the long-side surface (width-direction surface) of the wire 3 faces the Z-axis direction.

Although examples of the material constituting the wire 3 include good conductors of metals such as copper, a copper alloy, silver, and nickel, the material is not particularly limited insofar as it is a conductor material. The surface of the wire 3 is provided with an insulating coating. Although the resin constituting the insulating coating is not particularly limited, an epoxy modified acrylic resin or the like is used.

One end of the wire 3 (a wire end 3*a*) constitutes one end portion of the coil 2, and the other end of the wire 3 (a wire end 3*b*) constitutes the other end portion of the coil 2. The wire end 3*a* is linearly pulled out along the Y-axis direction from the lower end of the coil 2 (winding part of the coil 2). The wire end 3*b* is pulled out along the Y-axis direction from the upper end of the coil 2 (winding part of the coil 2) and is pulled out downward along the Z-axis direction. In other words, the wire end 3*b* is pulled out while bending from the Y-axis direction to the Z-axis direction and from the Z-axis direction to the Y-axis direction. Both the wire ends 3*a* and 3*b* are pulled out in the same direction (Y-axis direction) without being twisted.

Figure 4:
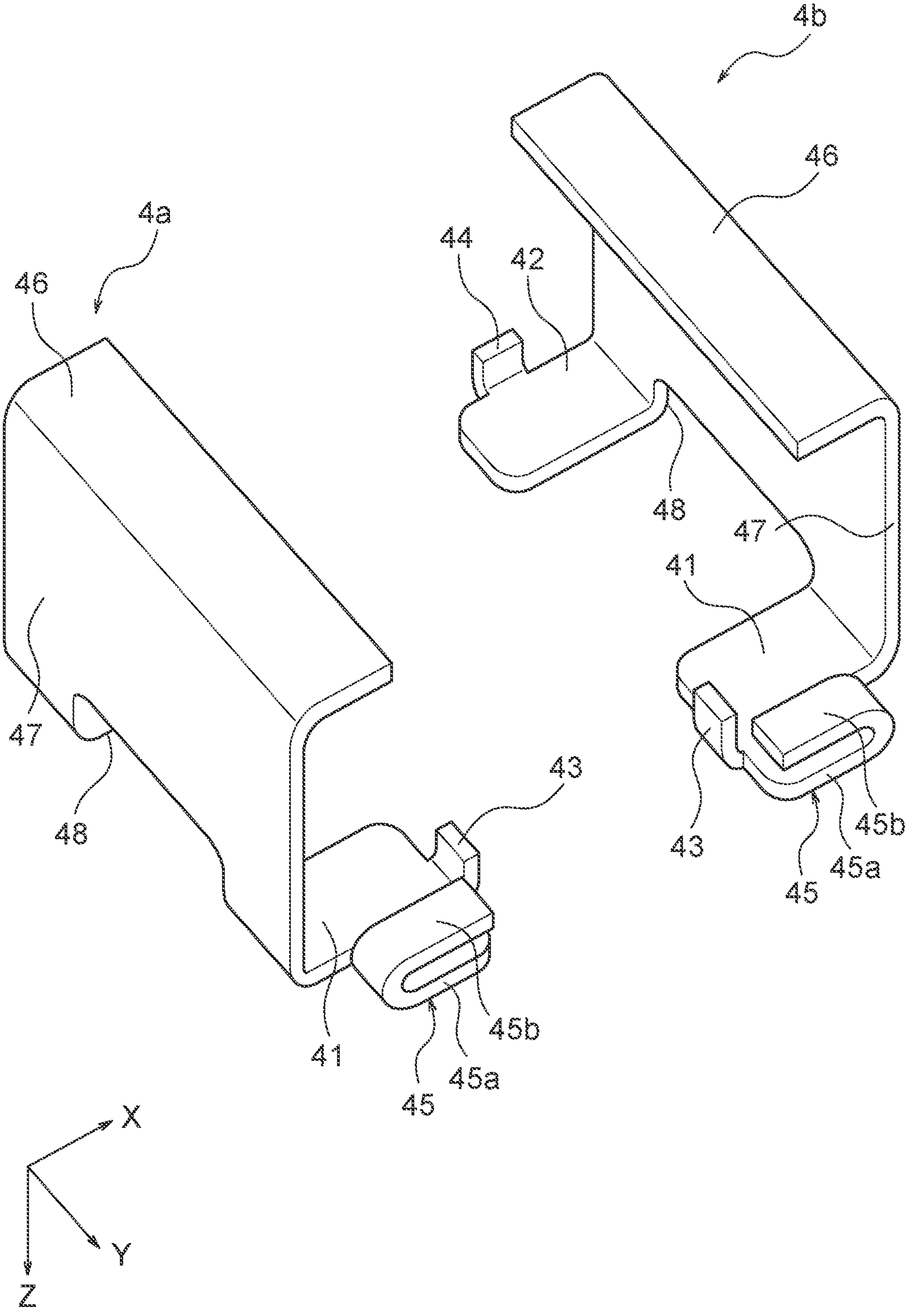
FIG. 4 is a perspective view of a terminal illustrated in FIG. 1.

As illustrated in FIG. 4, the terminals 4*a* and 4*b* are formed so as to be mirror-symmetrical with respect to the YZ plane. As illustrated in FIG. 5, the terminals 4*a* and 4*b* are disposed (placed) on the upper surface of the base portion 50 at a predetermined interval in the X-axis direction. The terminal 4*a* is disposed on one side of the base portion 50 in the X-axis direction, and the terminal 4*b* is disposed on the other side of the base portion 50 in the X-axis direction. Although the terminals 4*a* and 4*b* are formed by machining a metal plate material or the like, methods for forming the terminals 4*a* and 4*b* are not limited thereto.

As illustrated in FIG. 4, the terminals 4*a* and 4*b* have the first placement portion 41, the second placement portion 42, a first positioning portion 43, a second positioning portion 44, a connecting wire portion 45, a mounting portion 46, a connecting portion 47, and a notch portion 48.

The mounting portion 46 is fixed to the bottom surface of the second core 6 illustrated in FIG. 1. The mounting portion 46 has a predetermined width in the Y-axis direction and is fixed to the region from one end portion to the other end portion of the bottom surface of the second core 6 in the Y-axis direction. In addition, the mounting portion 46 has a predetermined width in the X-axis direction and is fixed to the end portion of the bottom surface of the second core 6 in the X-axis direction. The mounting portion 46 is connected to a circuit board (not illustrated) by solder, a conductive adhesive, or the like.

The connecting portion 47 is integrally connected to the mounting portion 46 and extends in a direction substantially perpendicular to the mounting portion 46. The connecting portion 47 is the part where the mounting portion 46 and the placement portions 41 and 42 are connected and is fixed to the outside surface of the second core 6 illustrated in FIG. 1. The connecting portion 47 extends along the outside surface of the second core 6 toward the side opposite to the first core 5 (Z-axis negative direction side). The connecting portion 47 of the terminal 4*a* and the connecting portion 47 of the terminal 4*b* are disposed so as to face each other in the X-axis direction. When the mounting portion 46 is connected to the circuit board (not illustrated) with solder, a solder fillet is formed at a part of the connecting portion 47. In other words, the connecting portion 47 also functions as a solder fillet forming portion.

The first placement portion 41 and the second placement portion 42 are integrally connected to the end portion of the connecting portion 47 in the Z-axis direction and extend in a direction substantially perpendicular to the connecting portion 47 (the same direction as the extension direction of the mounting portion 46: X-axis direction). The placement portions 41 and 42 have a surface substantially parallel to the upper surface of the first core 5 (base portion 50) and face the mounting portion 46 in the Z-axis direction. The placement portions 41 and 42 are placed on the upper surface of the base portion 50 (see FIG. 5) and sandwiched between the first core 5 and the second core 6 (see FIG. 1).

More specifically, as illustrated in FIGS. 2 and 4, the first placement portion 41 of the terminal 4*a* is disposed in the third recessed portion 51*c*, the second placement portion 42 of the terminal 4*a* is disposed in the fourth recessed portion

51*d*, the first placement portion 41 of the terminal 4*b* is disposed in the second recessed portion 51*b*, and the second placement portion 42 of the terminal 4*b* is disposed in the first recessed portion 51*a*.

As illustrated in FIG. 4, the first placement portion 41 is formed in the end portion on one side of the terminals 4*a* and 4*b* in the Y-axis direction and the second placement portion 42 is formed in the end portion on the other side of the terminals 4*a* and 4*b* in the Y-axis direction. The first placement portion 41 and the second placement portion 42 are disposed at a predetermined interval in the Y-axis direction, and the notch portion 48 separating the placement portions 41 and 42 is formed between the placement portions 41 and 42. As illustrated in FIG. 1, the notch portion 48 is formed at a position where at least the terminals 4*a* and 4*b* are exposed to the outside of the first core 5 and the second core 6. In the example illustrated in FIG. 4, the notch portion 48 reaches the lower end portion of the connecting portion 47 from the tip portions of the placement portions 41 and 42. By the terminals 4*a* and 4*b* being provided with the notch portion 48, the terminals 4*a* and 4*b* are easily folded at the intersection of the placement portions 41 and 42 and the connecting portion 47.

Figure 5:
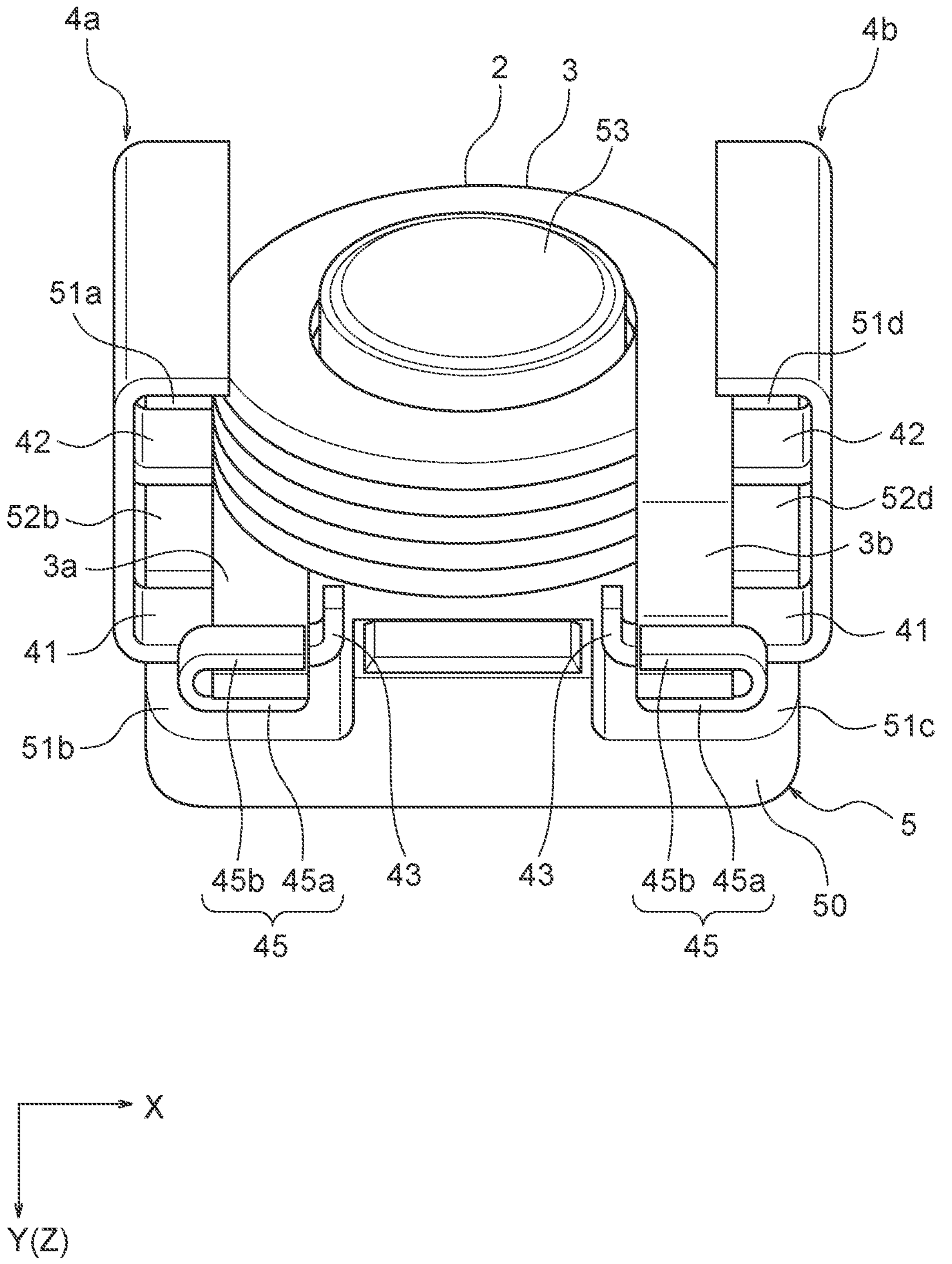
FIG. 5 is a perspective view in which the coil device illustrated in FIG. 1 is viewed from another angle.

When the terminals 4*a* and 4*b* are disposed on the upper surface of the base portion 50 as illustrated in FIG. 5, the fourth projecting portion 52*d* is disposed in the region where the notch portion 48 of the terminal 4*a* is formed and the second projecting portion 52*b* is disposed in the region where the notch portion 48 of the terminal 4*b* is formed.

As illustrated in FIG. 4, the connecting wire portion 45 is integrally formed in the end portion on one side of the first placement portion 41 in the Y-axis direction. The end portion of the coil 2 illustrated in FIG. 3 is connected to the connecting wire portion 45. The connecting wire portion 45 of the terminal 4*a* and the connecting wire portion 45 of the terminal 4*b* are disposed so as to face the same direction (Y-axis direction).

The connecting wire portion 45 has a fixed piece 45*a* and a folded piece 45*b*. The fixed piece 45*a* faces the folded piece 45*b* in the Z-axis direction and is integrally formed in the end portion on one side of the first placement portion 41 in the Y-axis direction. The fixed piece 45*a* has a shape in which the first placement portion 41 is extended to one end side in the Y-axis direction. The fixed piece 45*a* is placed on the upper surface of the base portion 50 as in the case of the first placement portion 41 (see FIG. 5).

The folded piece 45*b* is integrally formed in the end portion on the other side of the fixed piece 45*a* in the X-axis direction and is formed so as to be foldable with the end portion serving as a folding point (fulcrum). The folded piece 45*b* that is yet to be folded is formed so as to stand upright in the Z-axis direction. As illustrated, the folded piece 45*b* that is folded is formed so as to extend to one side in the X-axis direction. The folded piece 45*b* of the terminal 4*a* and the folded piece 45*b* of the terminal 4*b* extend in a direction in which the folded pieces 45*b* approach each other. The folded piece 45*b* is disposed together with the fixed piece 45*a* so as to face the upper surface of the base portion 50.

As illustrated in FIG. 5, the connecting wire portion 45 of the terminal 4*a* sandwiches and holds the wire end 3*a* of the wire 3 with the fixed piece 45*a* and the folded piece 45*b*. In addition, the connecting wire portion 45 of the terminal 4*b* sandwiches and holds the wire end 3*b* of the wire 3 with the fixed piece 45*a* and the folded piece 45*b*.

As in the case of the placement portions 41 and 42, the connecting wire portion 45 is placed on the surface of the base portion 50. The connecting wire portion 45 is sandwiched between the first core 5 and the second core 6 illustrated in FIG. 1. The holding surface at a time when the long-side surface of the wire ends 3*a* and 3*b* of the wire 3 is held by the connecting wire portion 45 is disposed so as to be substantially parallel to the upper surface of the base portion 50. In addition, the holding surface (abutting surface) of the wire ends 3*a* and 3*b* in the fixed piece 45*a*, the holding surface (abutting surface) of the wire ends 3*a* and 3*b* in the folded piece 45*b*, and the long-side surface of the wire ends 3*a* and 3*b* are disposed so as to be substantially parallel.

As illustrated in FIG. 4, the first positioning portion 43 is formed in the end portion on one side of the first placement portion 41 in the X-axis direction. The first positioning portion 43 is folded with the edge of the first placement portion 41 in the end portion serving as a folding point (fulcrum) and extends in the Z-axis direction. The first positioning portion 43 is formed on the side opposite to the side where the folding point of the folded piece 45*b* is disposed. The first positioning portion 43 of the terminal 4*a* and the first positioning portion 43 of the terminal 4*b* face each other in the X-axis direction.

The second positioning portion 44 is formed in the end portion on the other side of the second placement portion 42 in the Y-axis direction. The second positioning portion 44 is folded with the edge of the second placement portion 42 in the end portion serving as a folding point (fulcrum) and extends in the Z-axis direction. The second positioning portion 44 of the terminal 4*a* and the second positioning portion 44 of the terminal 4*b* face the side surface of the second core 6 illustrated in FIG. 1 (side surface vertically intersecting with the Y axis with the terminals 4*a* and 4*b* not fixed).

Each of the positioning portions 43 and 44 has a projection shape. Although the length of the positioning portions 43 and 44 in the Z-axis direction is not particularly limited, the length is approximately ¼ to ¾ of the longitudinal length of the folded piece 45*b*. The distance between the first positioning portion 43 of the terminal 4*a* and the first positioning portion 43 of the terminal 4*b* is smaller than the distance between the second positioning portion 44 of the terminal 4*a* and the second positioning portion 44 of the terminal 4*b*.

When the coil 2 and the terminals 4*a* and 4*b* are disposed on the upper surface of the base portion 50 as illustrated in FIG. 5, the positioning portions 43 and 44 of the terminal 4*a* and the positioning portions 43 and 44 of the terminal 4*b* are disposed in the vicinity of the outer periphery of the coil 2. As a result, the position of the coil 2 (movement in the X-axis, Y-axis, and rotation directions) is regulated with respect to the terminals 4*a* and 4*b* and the coil 2 can be positioned with respect to the terminals 4*a* and 4*b*.

It should be noted that the folded piece 45*b* of the connecting wire portion 45 that is yet to be folded is raised in the Z-axis direction and the coil 2 (more specifically, the wire ends 3*a* and 3*b* of the wire 3 constituting the end portion of the coil 2) can be positioned in this state.

With the terminals 4*a* and 4*b* disposed on the upper surface of the base portion 50, the coil 2 is disposed (placed) so as to straddle the first placement portion 41 and the second placement portion 42 of the terminal 4*a*, the first placement portion 41 and the second placement portion 42 of the terminal 4*b*, and the first to fourth projecting portions 52*a* to 52*d* of the base portion 50.

In the present embodiment, the connecting wire portion 45 (more accurately, the fixed piece 45*a*) of the terminals 4*a* and 4*b* is disposed on the first core 5 (base portion 50)

around the connecting wire portion 45 and the second core 6 illustrated in FIG. 1 is disposed on the connecting wire portion 45 (more accurately, the folded piece 45*b*).

Although there is a step between the disposition position of the connecting wire portion 45 (fixed piece 45*a*) and the disposition position of the coil 2 as described above, the height of the step is approximately equal to the plate thickness of the terminals 4*a* and 4*b* and is relatively small. Accordingly, in substance, the connecting wire portion 45 (fixed piece 45*a*) and the coil 2 are disposed on substantially the same plane of the base portion 50.

As illustrated in FIGS. 1 and 5, the second core 6 is formed together with the coil 2 so as to cover the upper surface of the base portion 50. The second core 6 is formed by, for example, performing injection molding after inserting a temporary assembly in which the first core 5 is combined with the coil 2 with the terminals 4*a* and 4*b* connected to the respective end portions into a mold. Alternatively, a pre-molded core (temporarily molded core) may be used as the second core 6. The materials constituting the second core 6 and the first core 5 may be identical in type to each other or different in type from each other. It should be noted that resin may be the only material constituting the second core 6.

When the second core 6 is combined with the first core 5, the second core 6 covers the coil 2 and a part of the terminals 4*a* and 4*b* (placement portions 41 and 42, positioning portions 43 and 44, and connecting wire portion 45).

Figure 6A:
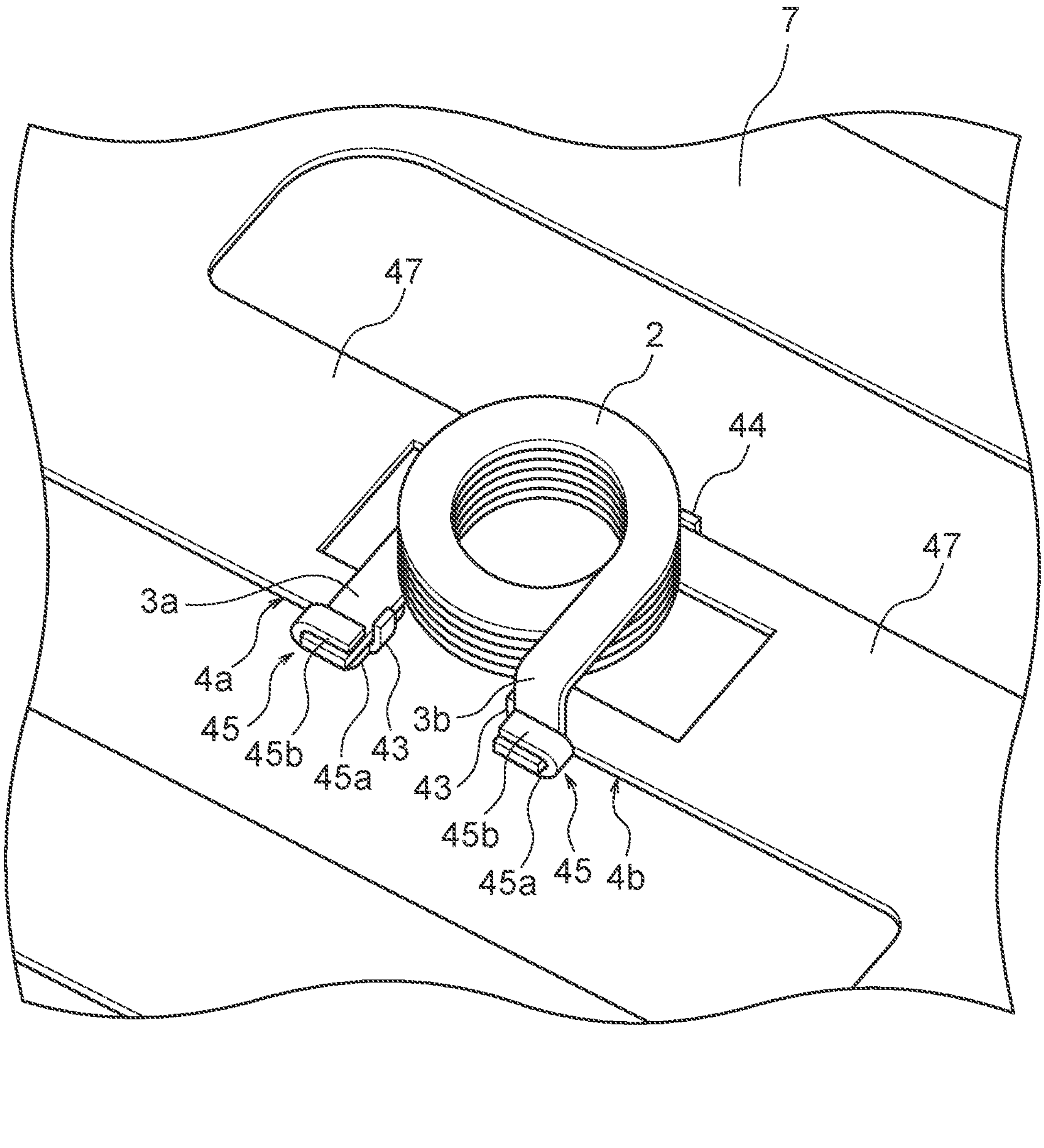
FIG. 6A is a diagram illustrating a method for manufacturing the coil device illustrated in FIG. 1.

Next, a method for manufacturing the inductor 1 will be described with reference to FIGS. 6A to 6E and the like. In the method of the present embodiment, a conductive plate such as a metal plate (such as a Sn-plated metal plate) is punched first into a shape as illustrated in FIG. 6A. As illustrated in FIG. 6A, the terminals 4*a* and 4*b* connected to a frame 7 via the connecting portion 47 are formed on the conductive plate after the punching.

Next, the terminals 4*a* and 4*b* are connected to the respective end portions of the coil 2 illustrated in FIG. 3 (wire ends 3*a* and 3*b* of the wire 3). At this time, a part of the bottom surface of the coil 2 is placed on the placement portions 41 and 42 of the terminals 4*a* and 4*b* while the position of the coil 2 with respect to the terminals 4*a* and 4*b* is regulated by the positioning portions 43 and 44 of the terminals 4*a* and 4*b*. Then, the wire ends 3*a* and 3*b* are sandwiched (held) between the fixed piece 45*a* and the folded piece 45*b* and the wire ends 3*a* and 3*b* are connected to the connecting wire portion 45.

Figure 6B:
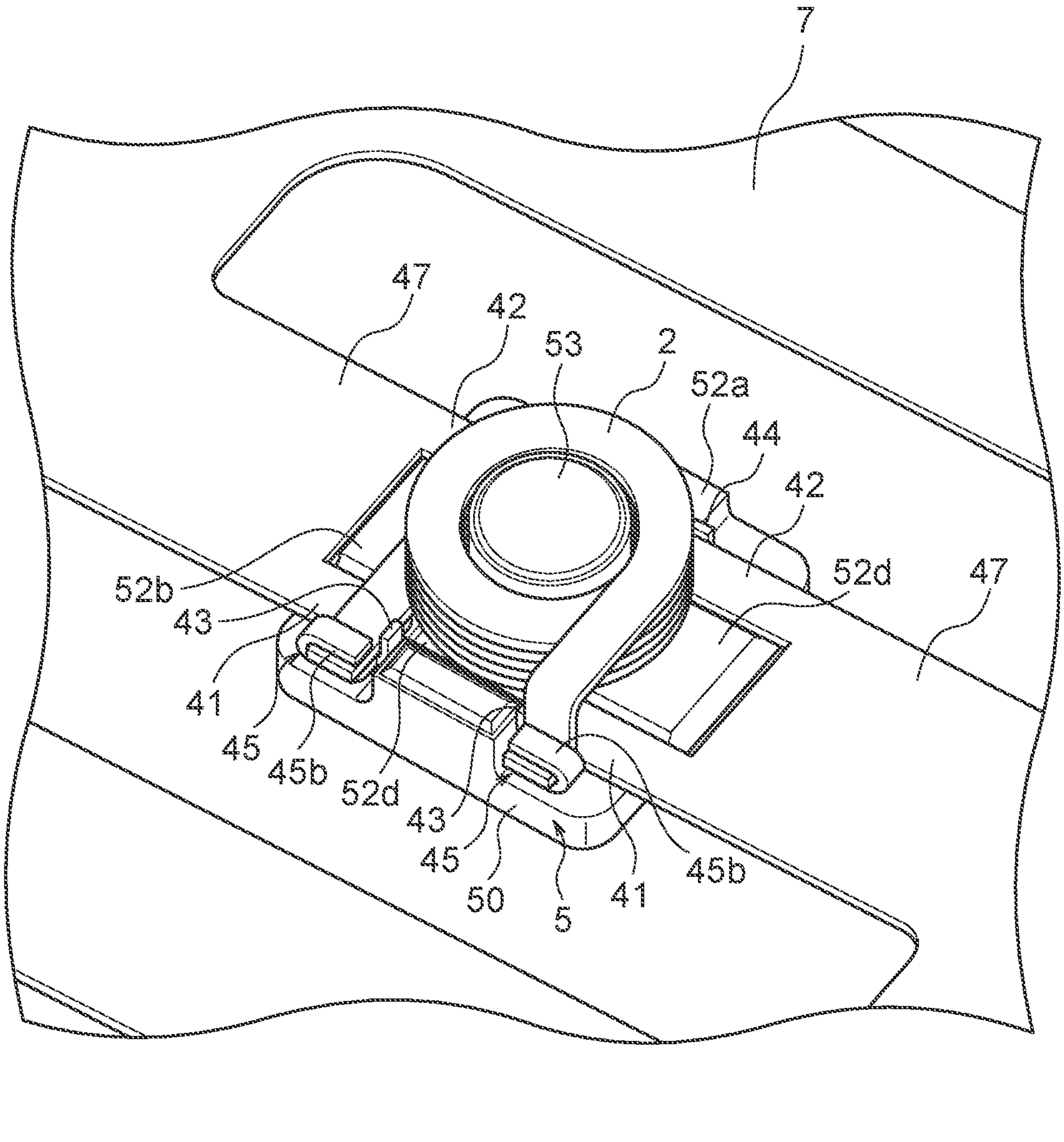
FIG. 6B is a diagram illustrating the process subsequent to FIG. 6A.

Next, as illustrated in FIG. 6B, the first core 5 illustrated in FIG. 2 is combined with the coil 2 with the terminals 4*a* and 4*b* fixed to the respective end portions. The temporary assembly is configured as a result. More specifically, the columnar portion 53 of the first core 5 is inserted inside the coil 2 and the placement portions 41 and 42 of the terminals 4*a* and 4*b* are placed on the upper surface of the base portion 50. At this time, a part of the bottom surface of the coil 2 is placed on the projecting portions 52*a* to 52*d* of the base portion 50. A pre-molded core (temporarily molded core) is used as the first core 5. A fluid material is used and a composite magnetic material using a thermoplastic resin or a thermosetting resin as a binder is used as the material constituting the first core 5.

Laser welding is performed on the connecting wire portion 45 before or after the configuration of the temporary assembly (that is, in the state illustrated in FIG. 6A or FIG. 6B). The laser welding is performed by, for example, performing laser emission toward the folded piece 45*b* from above the connecting wire portion 45. A laser ball (not illustrated) is formed at the part irradiated with the laser.

Next, the temporary assembly illustrated in FIG. 6B is inserted into the mold and the second core 6 is formed by injection molding in the mold. At this time, the connecting portion 47 of the terminals 4*a* and 4*b* is exposed from the mold. During the injection molding, a mixture containing magnetic powder and binder resin is fluidized by heating or the like, injected into the mold, and solidified by cooling or the like. The second core 6 illustrated in FIG. 6C is obtained as a result.

In the illustrated example, a step portion 60 is formed on the surface of the second core 6 so as to straddle the side and bottom surfaces thereof. The mounting portion 46 (FIG. 4) of the terminals 4*a* and 4*b* can be disposed at a part of the step portion 60 formed on the bottom surface of the second core 6. The connecting portion 47 of the terminals 4*a* and 4*b* can be disposed at a part of the step portion 60 formed on the side surface of the second core 6.

Figure 6C:
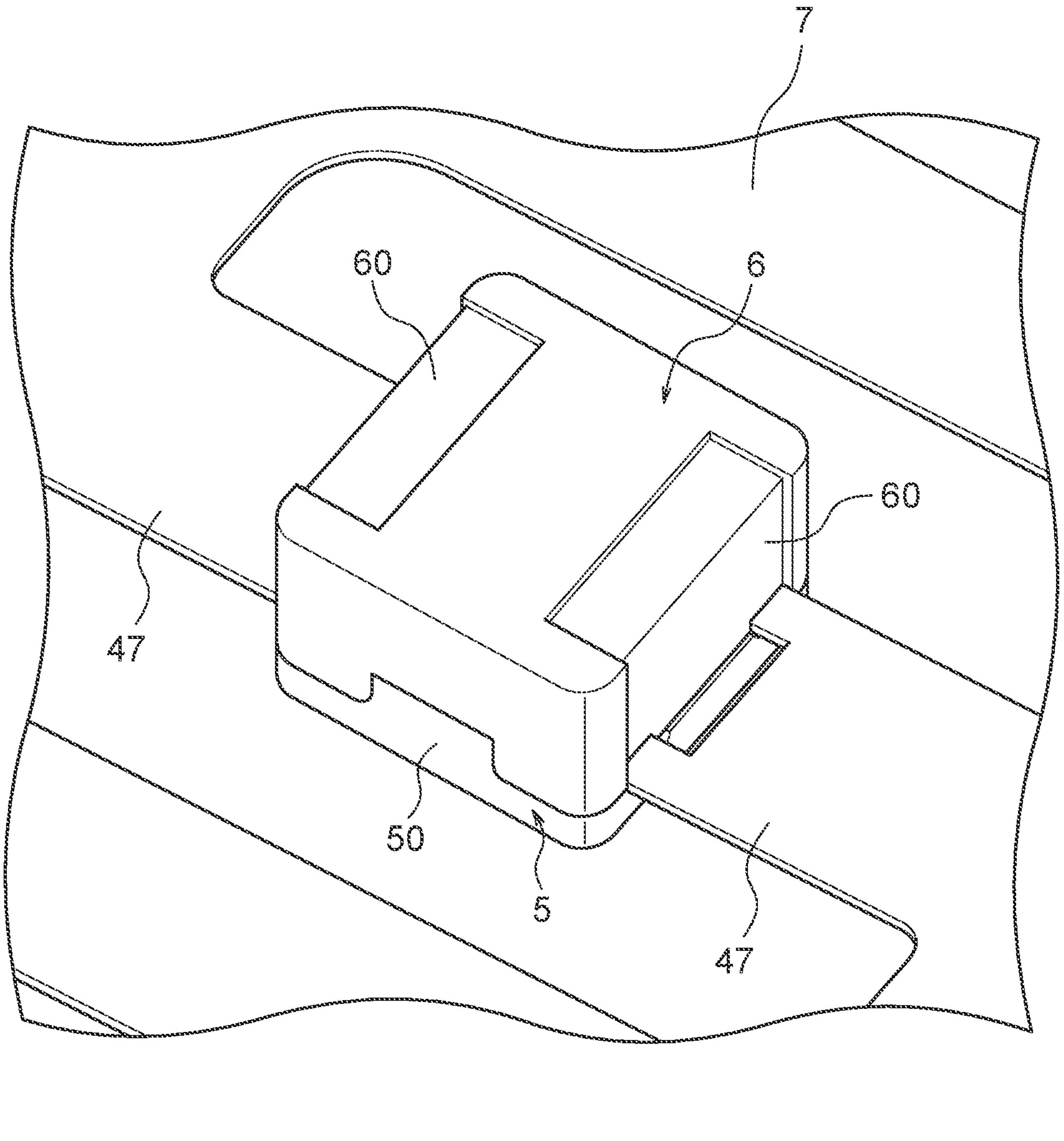
FIG. 6C is a diagram illustrating the process subsequent to FIG. 6B.
Figure 6D:
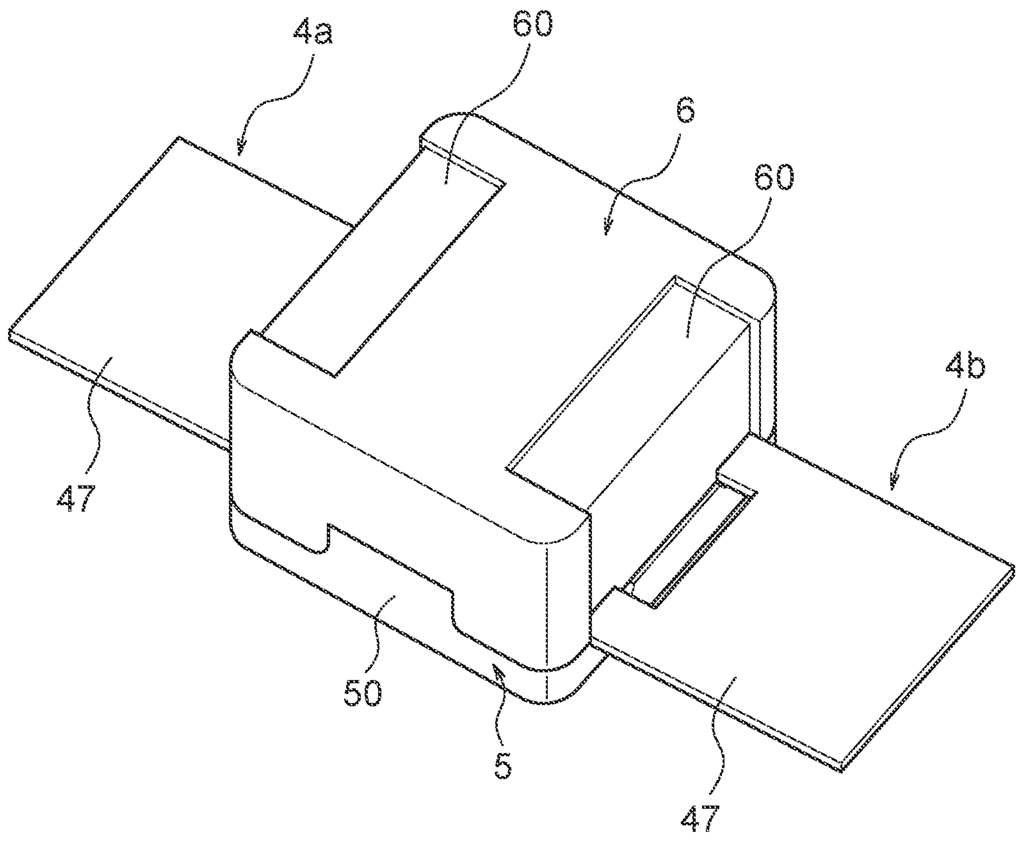
FIG. 6D is a diagram illustrating the process subsequent to FIG. 6C.
Figure 6E:
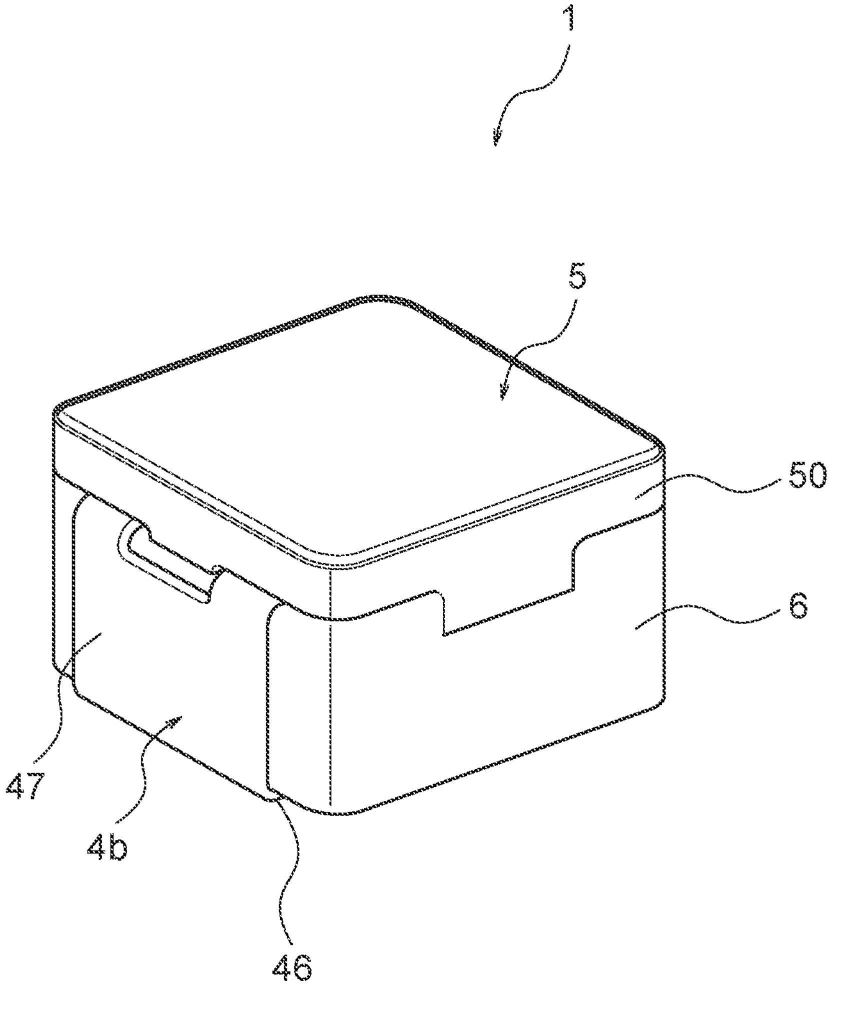
FIG. 6E is a diagram illustrating the process subsequent to FIG. 6D.

Next, as illustrated in FIG. 6D, the frame 7 illustrated in FIG. 6C is cut with a cutting tool and removed. As illustrated in FIG. 6E, the part left after the removal (connecting portion 47) is fixed to the step portion 60. More specifically, as illustrated in FIG. 6E, the connecting portion 47 of the terminals 4*a* and 4*b* is folded substantially vertically from the state illustrated in FIG. 6D and the connecting portion 47 is fixed to a part of the step portion 60 formed on the side surface of the second core 6. In addition, in that state, the tip portion of the connecting portion 47 is folded substantially vertically and fixed to a part of the step portion 60 formed on the bottom surface of the second core 6. The inductor 1 according to the present embodiment can be obtained in this manner.

In the inductor 1 according to the present embodiment, the terminals 4*a* and 4*b* are disposed on the upper surface of the base portion 50 and the upper surface of the base portion 50 is covered with the second core 6. Accordingly, a part of the terminals 4*a* and 4*b* disposed on the base portion 50 (placement portions 41 and 42, connecting wire portion 45, etc.) is covered with the first core 5 (base portion 50) and the second core 6 and the terminals 4*a* and 4*b* are fixed to the respective cores 5 and 6 via the part. Accordingly, in the inductor 1 according to the present embodiment, there is no need to fix the terminals 4*a* and 4*b* to the second core 6 via the connecting portion 47 between the connecting wire portion 45 and the mounting portion 46 unlike in the related art and the connecting portion 47 can be disposed outside the second core 6. Accordingly, the volume of the second core 6 can be sufficiently ensured and the inductor 1 having satisfactory inductance characteristics can be realized. The effect of the present embodiment is particularly noticeable when the inductor 1 is reduced in size or its current is increased. Accordingly, the inductor 1 suitable for size reduction and an increase in current can be realized.

In addition, in the present embodiment, the connecting wire portion 45 of the terminals 4*a* and 4*b* is disposed on the first core 5 and the second core 6 is disposed on the connecting wire portion 45. Accordingly, the connecting wire portion 45 can be disposed between the first core 5 and the second core 6, the connecting wire portion 45 can be effectively protected from an external factor such as an external force, and the occurrence of open inferiority can be prevented. In addition, by the connecting wire portion 45 being disposed on the first core 5, a positional deviation of the connecting wire portion 45 can be prevented when the second core 6 is disposed on the connecting wire portion 45.

In addition, in the present embodiment, the first core 5 and the second core 6 are joined on substantially the same plane. Accordingly, a part of the terminals 4*a* and 4*b* disposed in the second core 6 (placement portions 41 and 42) can be pulled out as the connecting portion 47 to the outside of each of the cores 5 and 6 along the joining surface of the first core 5 and the second core 6 and the shapes of the terminals 4*a* and 4*b* can be simplified.

In addition, in the present embodiment, the connecting wire portion 45 of the terminals 4*a* and 4*b* and the coil 2 are disposed on substantially the same plane of the base portion 50. Accordingly, the terminals 4*a* and 4*b* can be easily placed on the upper surface of the base portion 50 together with the coil 2 during the manufacturing and the manufacturing can be facilitated.

In addition, in the present embodiment, the terminals 4*a* and 4*b* are disposed below the disposition surface of the coil 2 with respect to the base portion 50. Accordingly, the disposition surface of the coil 2 (upper surface of the placement portions 41 and 42) and the disposition surface (recessed portions 51*a* to 51*d*) of the terminals 4*a* and 4*b* (placement portions 41 and 42) can be deviated from each other and the coil 2 can be stably disposed above the base portion 50 even if a part of the terminals 4*a* and 4*b* (placement portions 41 and 42) and a part of the bottom surface of the coil 2 are disposed so as to overlap on the upper surface of the base portion 50 (recessed portions 51*a* to 51*d*).

In addition, in the present embodiment, the terminals 4*a* and 4*b* extend along the side surface of the second core 6 toward the side opposite to the first core 5. The second core 6 covers the coil 2 and so on, and thus the second core 6 is larger in side surface area than the first core 5 in terms of its configuration. Accordingly, with the above configuration, the connecting portion 47 of the terminals 4*a* and 4*b* is disposed over a wide range on the side surface of the second core 6 and a solder fillet can be sufficiently formed in the connecting portion 47. Accordingly, the mounting strength of the inductor 1 with respect to a substrate can be enhanced.

In addition, in the present embodiment, the notch portion 48 is formed in the terminals 4*a* and 4*b* and the notch portion 48 is formed at the position where at least the terminals 4*a* and 4*b* are exposed to the outside of the first core 5 and the second core 6. Accordingly, the terminals 4*a* and 4*b* (intersection of the placement portions 41 and 42 and the connecting portion 47) can be easily folded along the side surface of the second core 6 at the position where the terminals 4*a* and 4*b* are exposed to the outside of the first core 5 and the second core 6 and the part beyond the folding position (connecting portion 47) can be used as the solder fillet forming portion of the terminals 4*a* and 4*b*.

In addition, in the present embodiment, the pair of terminals 4*a* and 4*b* are respectively connected to the end portions of the coil 2 and the connecting wire portion 45 of the terminal 4*a* and the connecting wire portion 45 of the terminal 4*b* are disposed so as to face the same direction (Y-axis positive direction). Accordingly, laser irradiation can be easily performed on the connecting wire portions 45 and 45 in a case where, for example, laser welding is performed on the connecting wire portions 45 and 45 and the manufacturing can be facilitated.

In addition, in the present embodiment, the columnar portion 53 is formed so as to be positionally deviated to the outside with respect to the central portion of the base portion 50. Accordingly, a space is formed in the central portion of the base portion 50 and the connecting wire portion 45 of the terminals 4*a* and 4*b* and so on can be placed with a margin in the space. Accordingly, there is no need to expand the base portion 50 to the outside in order to ensure a space for placing the connecting wire portion 45 or the like and the inductor 1 can be reduced in size.

In addition, in the present embodiment, the first core 5 has an outer surface on the side opposite to the mounting surface. In other words, in the present embodiment, the mounting surface is formed on the second core 6. The second core 6 covers the coil 2 and so on as described above, and thus the second core 6 is larger in side surface area than the first core 5 in terms of its configuration. Accordingly, by the second core 6 being provided with the mounting surface, the solder fillet forming portion (connecting portion 47) with a sufficient area can be formed on the second core 6 and the mounting strength of the inductor 1 with respect to a substrate can be enhanced.

Second Embodiment

An inductor 101 according to the second embodiment of the present invention differs only in the following points and the other configurations thereof are identical to those of the first embodiment described above. In the following description, the parts common to the first and second embodiments are denoted by the same reference numerals with detailed description thereof omitted.

Figure 7:
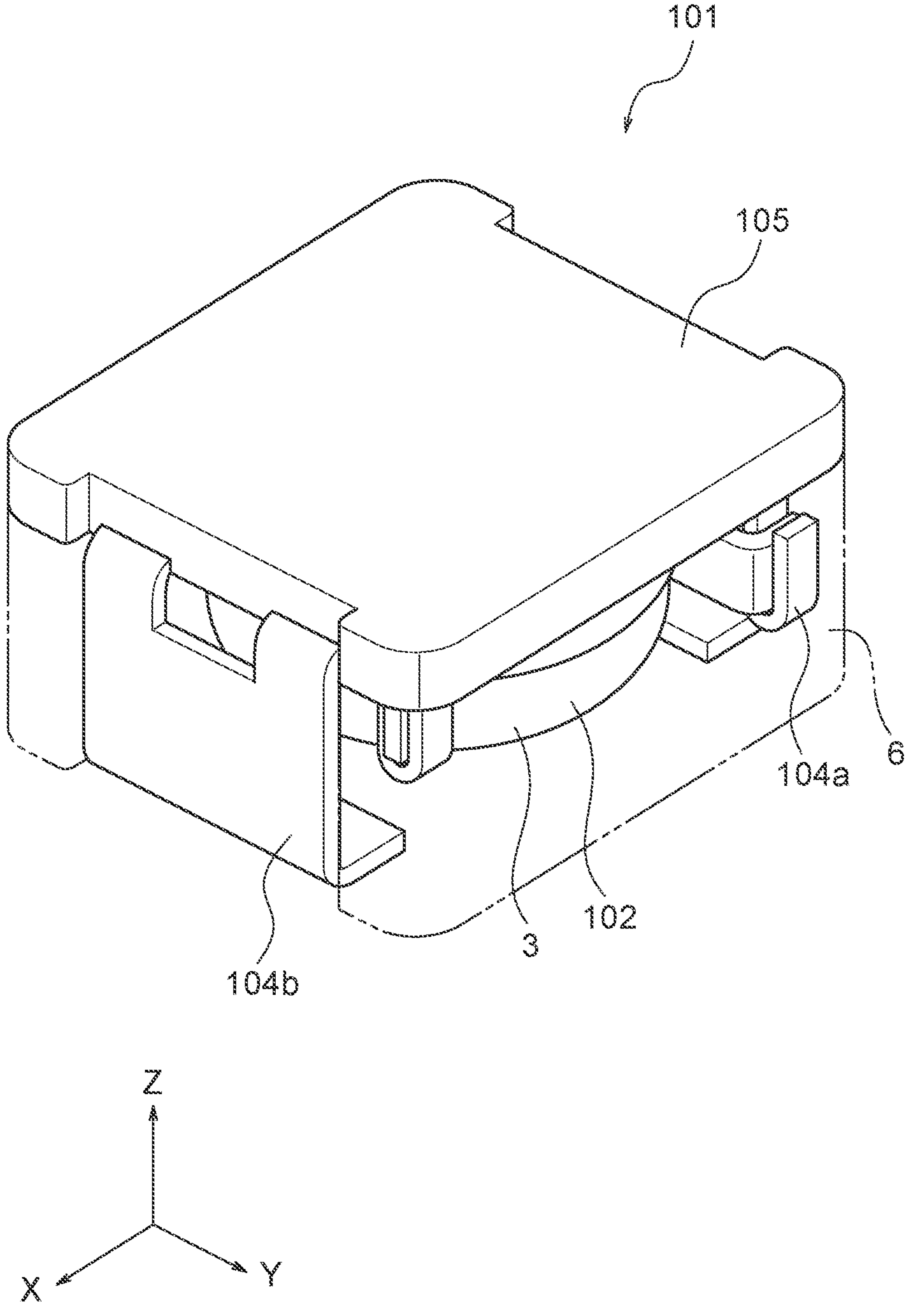
FIG. 7 is a perspective view of a coil device according to a second embodiment of the present invention.
Figure 8:
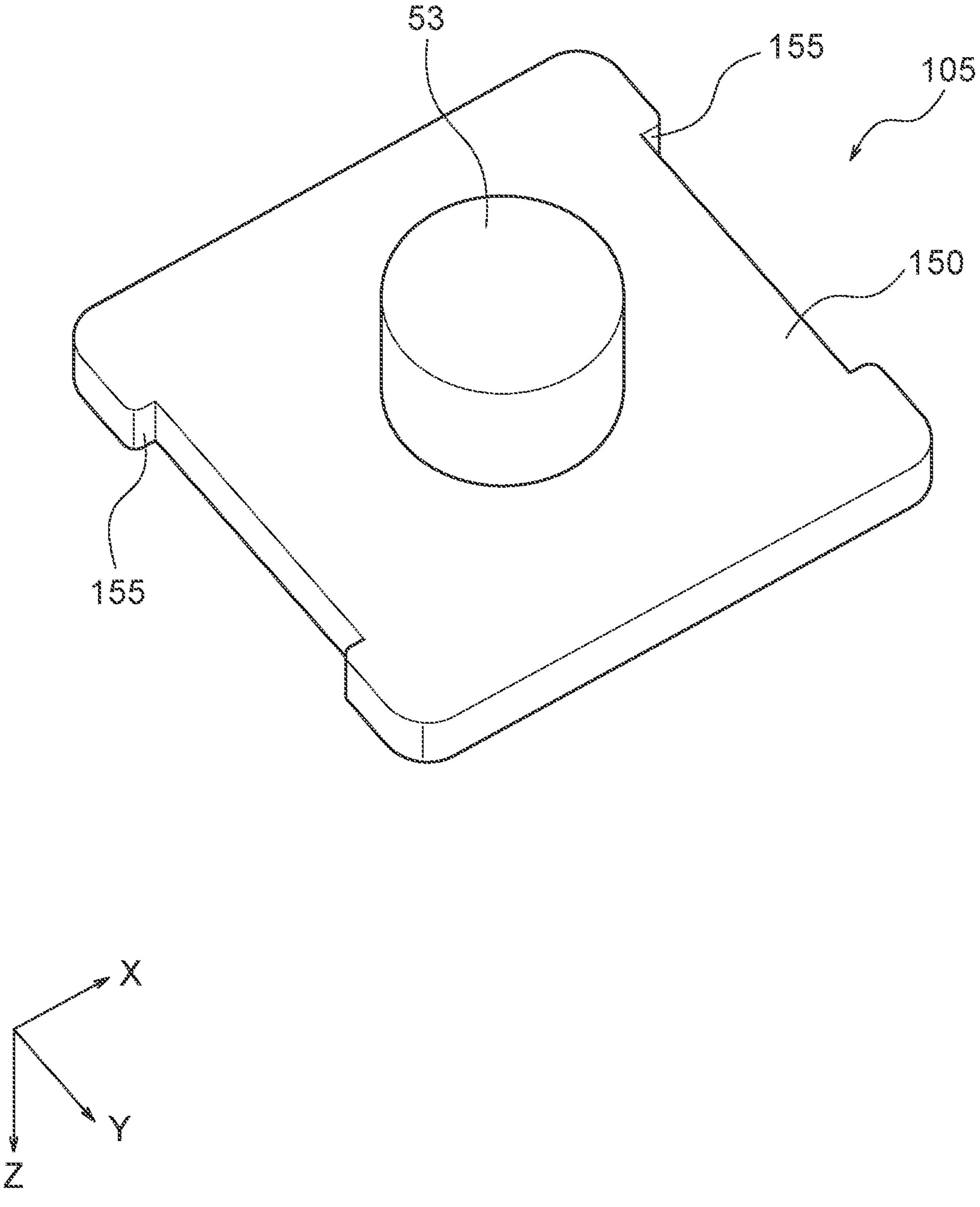
FIG. 8 is a perspective view of a first core illustrated in FIG. 7.

As illustrated in FIG. 7, the inductor 101 has a coil 102, terminals 104*a* and 104*b*, and a first core 105. As illustrated in FIG. 8, the first core 105 has a base portion 150 instead of the base portion 50 in the first embodiment. The base portion 150 is different from the base portion 50 (FIG. 2) in the first embodiment in that the recessed portions 51*a* to 51*d*, the projecting portions 52*a* to 52*d*, and the protruding portion 54 are not formed on the upper surface thereof. In other words, the upper surface of the base portion 150 in the present embodiment is made of a flat surface without unevenness. It should be noted that a recessed portion 155 may be omitted although the recessed portion 155 is formed in each end portion of the base portion 150 in the X-axis direction.

Figure 9:
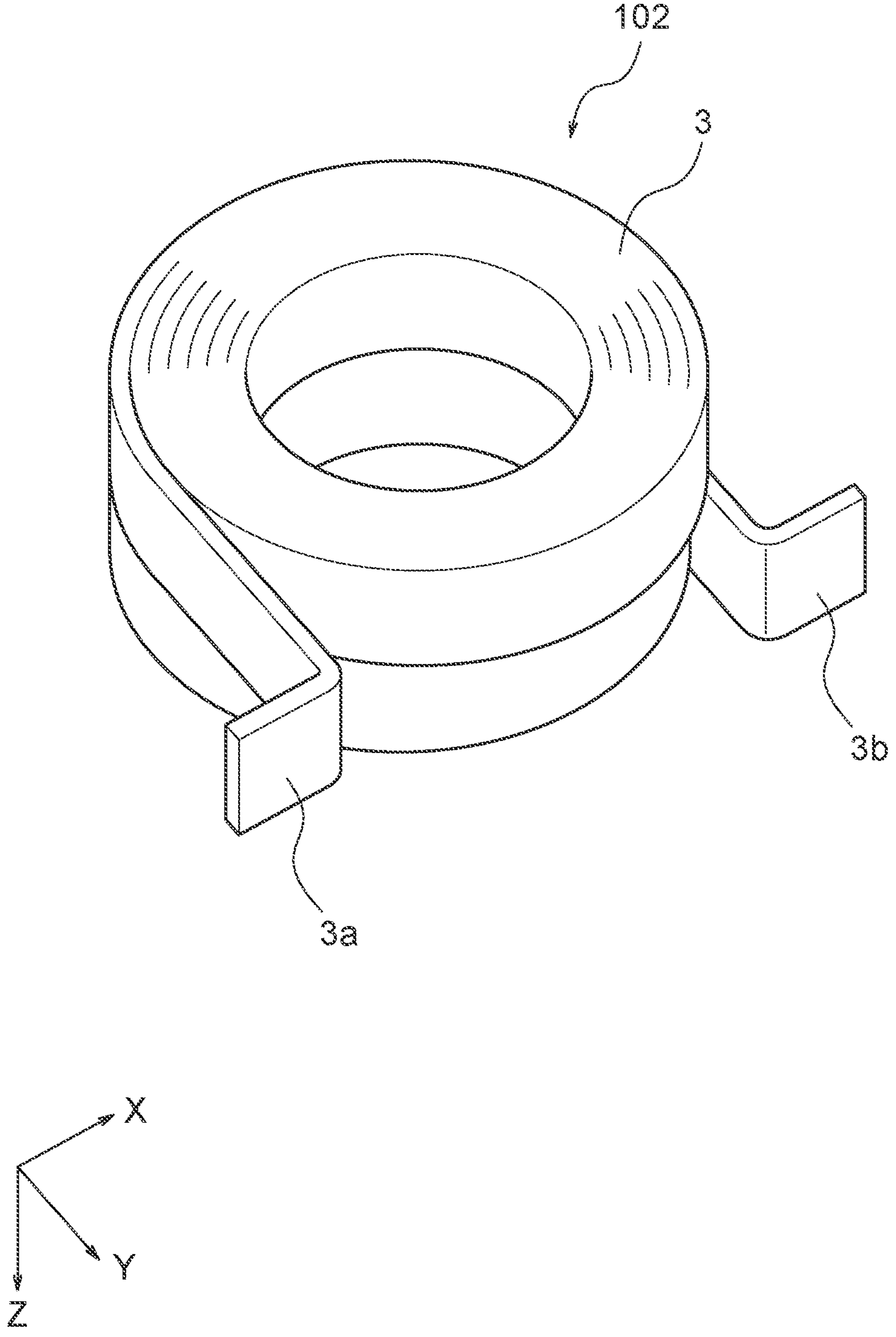
FIG. 9 is a perspective view of a coil illustrated in FIG. 7.
Figure 11:
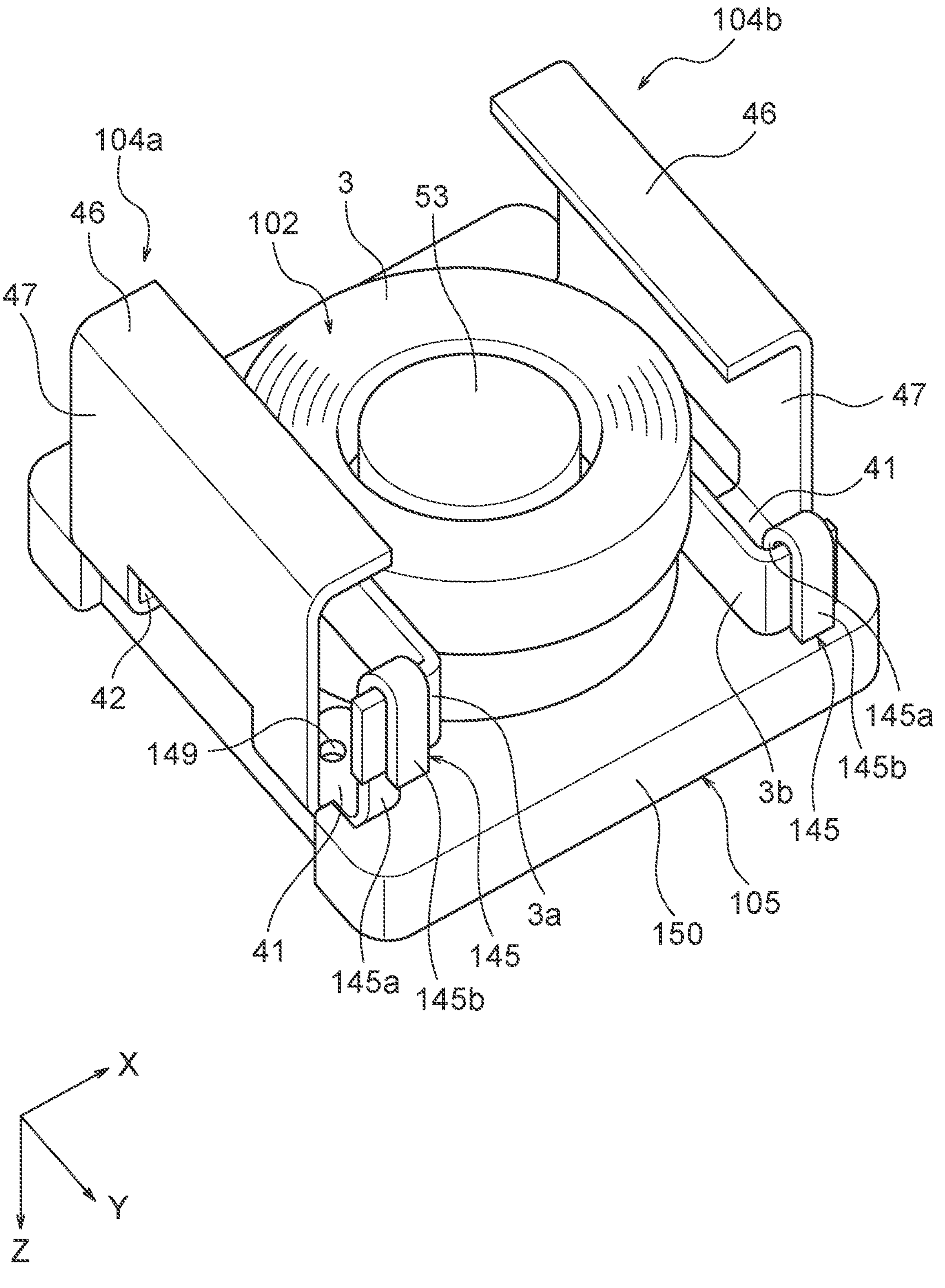
FIG. 11 is a perspective view in which the coil device illustrated in FIG. 7 is viewed from another angle.

As illustrated in FIG. 9, the coil 102 is different from the coil 2 (FIG. 3) in the first embodiment in that the wire 3 made of a flat wire is wound flatwise. The long-side surface (width-direction surface) of the wire 3 constitutes the inner peripheral surface or the outer peripheral surface of the coil 2, and the short-side surface (edge-side surface) of the wire 3 faces the Z-axis direction. The coil 102 is α-wound and is disposed (placed) on the upper surface of the base portion 150 as illustrated in FIG. 11.

As illustrated in FIG. 9, the wire end 3*a* of the wire 3 is bent in a substantially L shape and is linearly pulled out along the Y-axis direction from the upper end of the coil 102 (winding part of the coil 102). The wire end 3*b* of the wire 3 is bent in a substantially L shape and is linearly pulled out along the Y-axis direction from the lower end of the coil 102 (winding part of the coil 102). Both the wire ends 3*a* and 3*b* are pulled out in the same direction (Y-axis direction) without being twisted.

Figure 10:
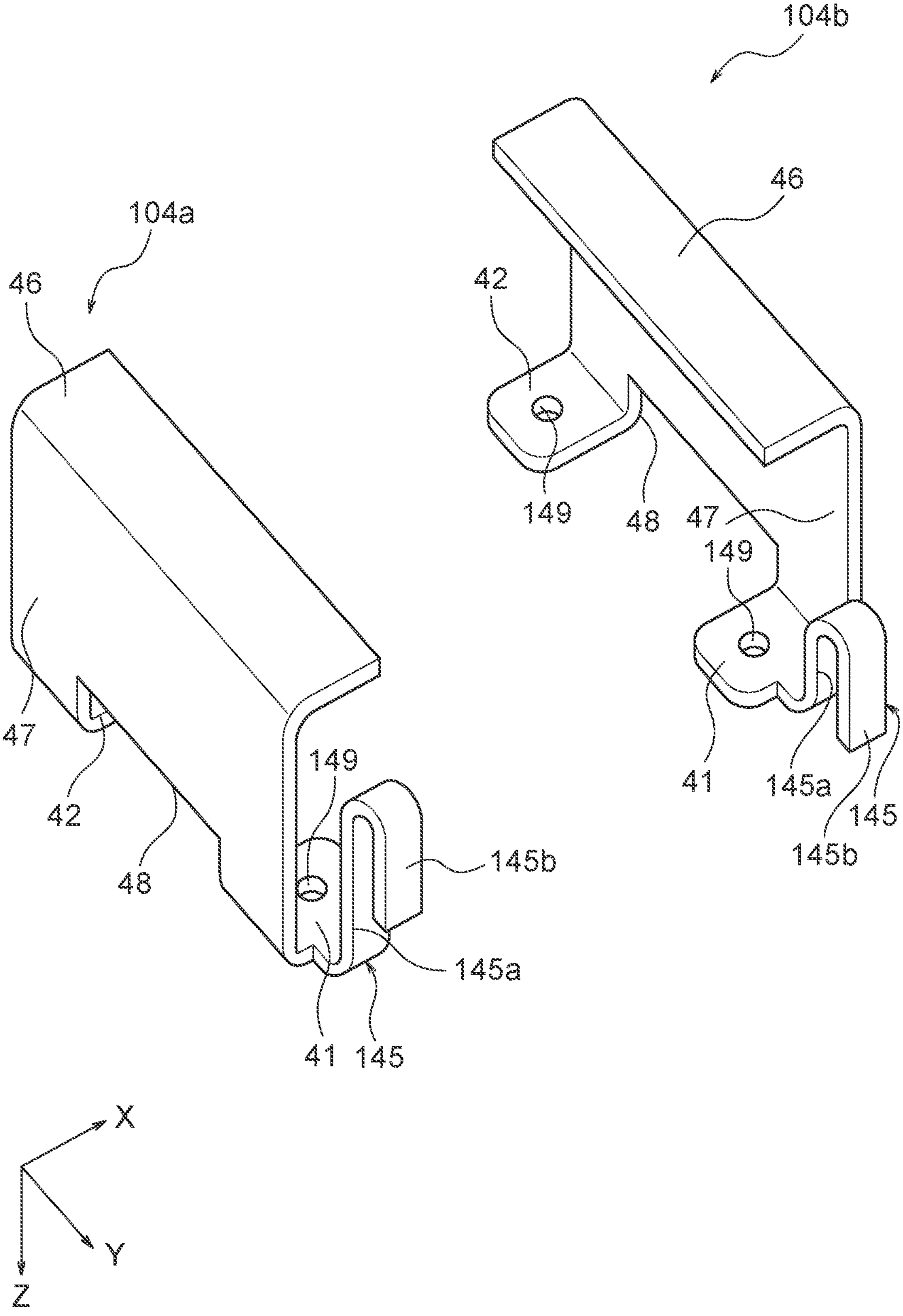
FIG. 10 is a perspective view of a terminal illustrated in FIG. 7.

As illustrated in FIG. 10, the terminals 104*a* and 104*b* are different from the terminals 4*a* and 4*b* (FIG. 4) in the first embodiment in that the terminals 104*a* and 104*b* are provided with a connecting wire portion 145 and a fixing hole 149 and are not provided with the positioning portions 43 and 44. The fixing hole 149 is formed in each of the first placement portion 41 and the second placement portion 42. When the second core 6 is formed, the material forming the second core 6 (mixture containing magnetic powder and binder resin) enters the fixing hole 109 in a mold. As a result, the terminals 104a and 104b can be firmly fixed to the second core 6.

The connecting wire portion 145 of the terminal 104a and the connecting wire portion 145 of the terminal 104b are disposed so as to face the same direction (Y-axis direction). The connecting wire portion 145 has a fixed piece 145a and a folded piece 145b.

The fixed piece 145a faces the folded piece 145b in the Y-axis direction and is integrally formed in the end portion on one side of the first placement portion 41 in the Y-axis direction. The fixed piece 145a is folded upward with the end portion on one side of the first placement portion 41 in the Y-axis direction serving as a folding point (fulcrum).

The length of the fixed piece 145a of the terminal 104a in the Z-axis direction is longer than the length of the fixed piece 145a of the terminal 104b in the Z-axis direction and is longer than the length of the folded piece 145b of the terminal 104a in the Z-axis direction. The length of the fixed piece 145a of the terminal 104b in the Z-axis direction is substantially equal to the length of the folded piece 145b of the terminal 104b in the Z-axis direction.

The folded piece 145b is integrally formed in the end portion on one side of the fixed piece 145a in the Z-axis direction and is folded downward with the end portion serving as a folding point (fulcrum). Both the fixed piece 145a and the folded piece 145b are formed so as to extend in the Z-axis direction and are disposed in the direction perpendicular to the upper surface of the base portion 150.

As illustrated in FIG. 11, the connecting wire portion 145 of the terminal 104a sandwiches and holds the wire end 3a of the wire 3 with the fixed piece 145a and the folded piece 145b. The wire end 3a of the wire 3 is pulled out from the upper end of the coil 102, and thus the connecting wire portion 145 of the terminal 104a holds the wire end 3a above the upper surface of the base portion 150.

The connecting wire portion 145 of the terminal 104b sandwiches and holds the wire end 3b of the wire 3 with the fixed piece 145a and the folded piece 145b. The wire end 3b of the wire 3 is pulled out from the lower end of the coil 102, and thus the connecting wire portion 145 of the terminal 104b holds the wire end 3b in a state of being placed on the upper surface of the base portion 150.

The holding surface at a time when the long-side surface of the wire ends 3a and 3b of the wire 3 is held by the connecting wire portion 145 is disposed so as to be substantially parallel to the side surface of the second core 6 illustrated in FIG. 7 (side surface vertically intersecting with the Y axis with the terminals 104a and 104b not fixed) and is disposed so as to be substantially perpendicular to the upper surface of the base portion 50. Alternatively, the holding surface of the connecting wire portion 145 may be disposed so as to be slightly inclined with respect to the side surface of the second core 6.

The holding surface of the connecting wire portion 145 is disposed so as to be substantially parallel to the winding axis of the coil 102. The sandwiching direction at a time when the wire ends 3a and 3b of the wire 3 are sandwiched between the fixed piece 145a and the folded piece 145b is substantially perpendicular to the winding axis of the coil 102.

The holding surface (abutting surface) of the wire ends 3a and 3b in the fixed piece 145a, the holding surface (abutting surface) of the wire ends 3a and 3b in the folded piece 145b, and the long-side surface of the wire ends 3a and 3b are disposed so as to be parallel and face the side surface of the second core 6 (side surface vertically intersecting with the Y axis).

The present embodiment is similar in effect to the first embodiment. In addition, in the present embodiment, the holding surface at a time when the long-side surface of the wire ends 3a and 3b of the wire 3 is held by the connecting wire portion 145 extends in parallel to the winding axis of the coil 102 and the directions of the long-side surface and the holding surface of the connecting wire portion 145 are aligned, even without the wire ends 3a and 3b being twisted, when the wire ends 3a and 3b are pulled out from the winding part of the coil 102. Accordingly, the end portion of the coil 102 can be held on the holding surface without being twisted, unevenness in the inductance characteristics of the inductor 1 can be prevented, and the highly reliable inductor 1 can be realized.

In addition, in the present embodiment, the holding surface of the connecting wire portion 145 faces the side surface of the second core 6 (side surface vertically intersecting with the Y axis). Accordingly, laser irradiation can be easily performed on the connecting wire portion 145 in a case where, for example, laser welding is performed on the connecting wire portion 145 and the manufacturing can be facilitated.

Third Embodiment

An inductor 201 according to the third embodiment of the present invention differs only in the following points and the other configurations thereof are identical to those of the second embodiment described above. In the following description, the parts common to the second and third embodiments are denoted by the same reference numerals with detailed description thereof omitted.

Figure 12:
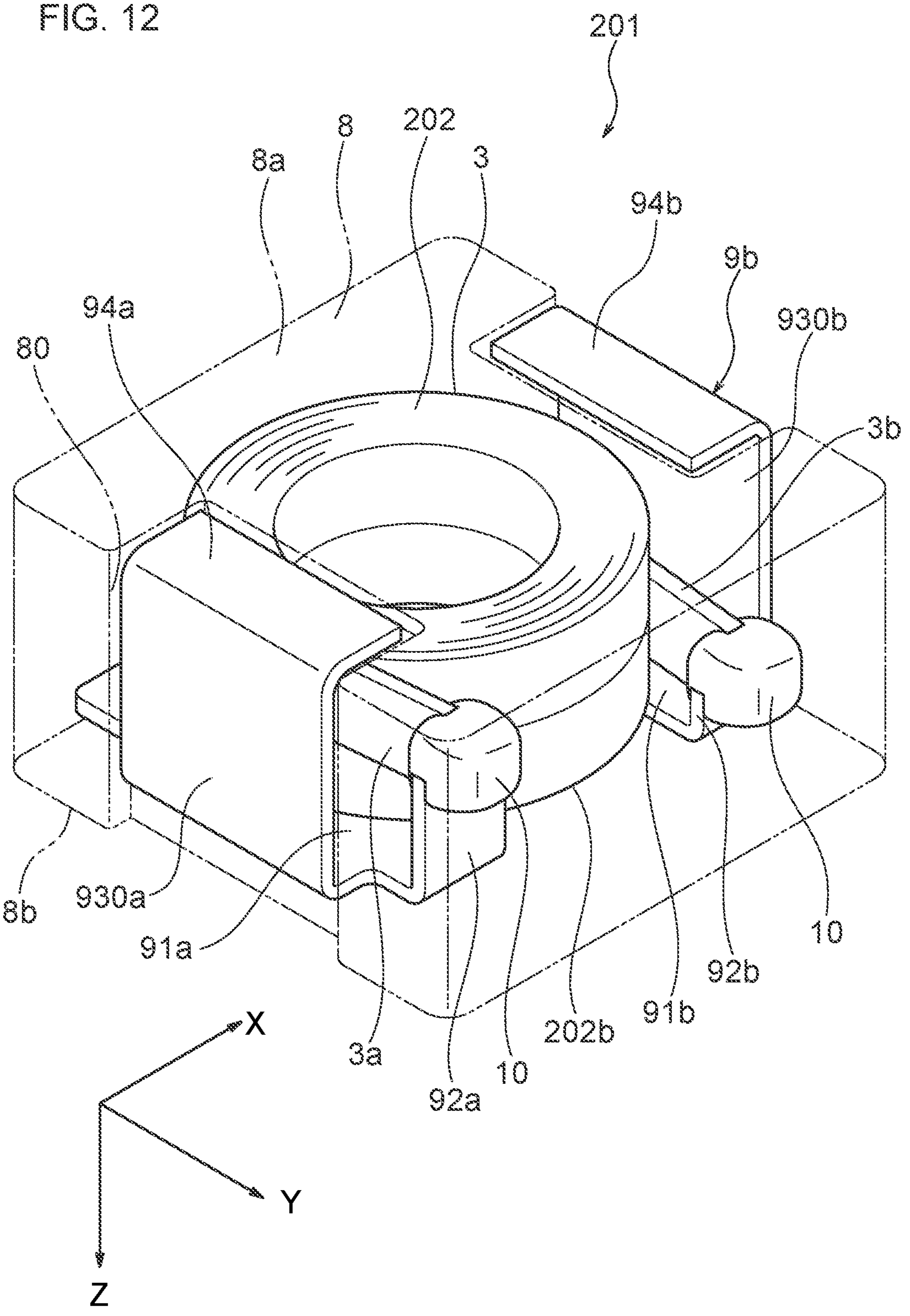
FIG. 12 is a perspective view of a coil device according to a third embodiment of the present invention.

As illustrated in FIG. 12, the inductor 201 has a coil 202, a pair of terminals 9a and 9b, and a core (element body) 8. The core 8 is made of a mixture containing magnetic powder and binder resin and is formed by combining a first core 205 illustrated in FIG. 13 and a second core 206 illustrated in FIG. 14. In other words, the core 8 is formed by compression-molding the pre-molded first core 205 and second core 206 in a mold and integrating the cores. It should be noted that the boundary portion between the first core 205 and the second core 206 cannot be identified and the first core 205 and the second core 206 are mixed and integrated at the part where the first core 205 and the second core 206 are joined.

Figure 13:
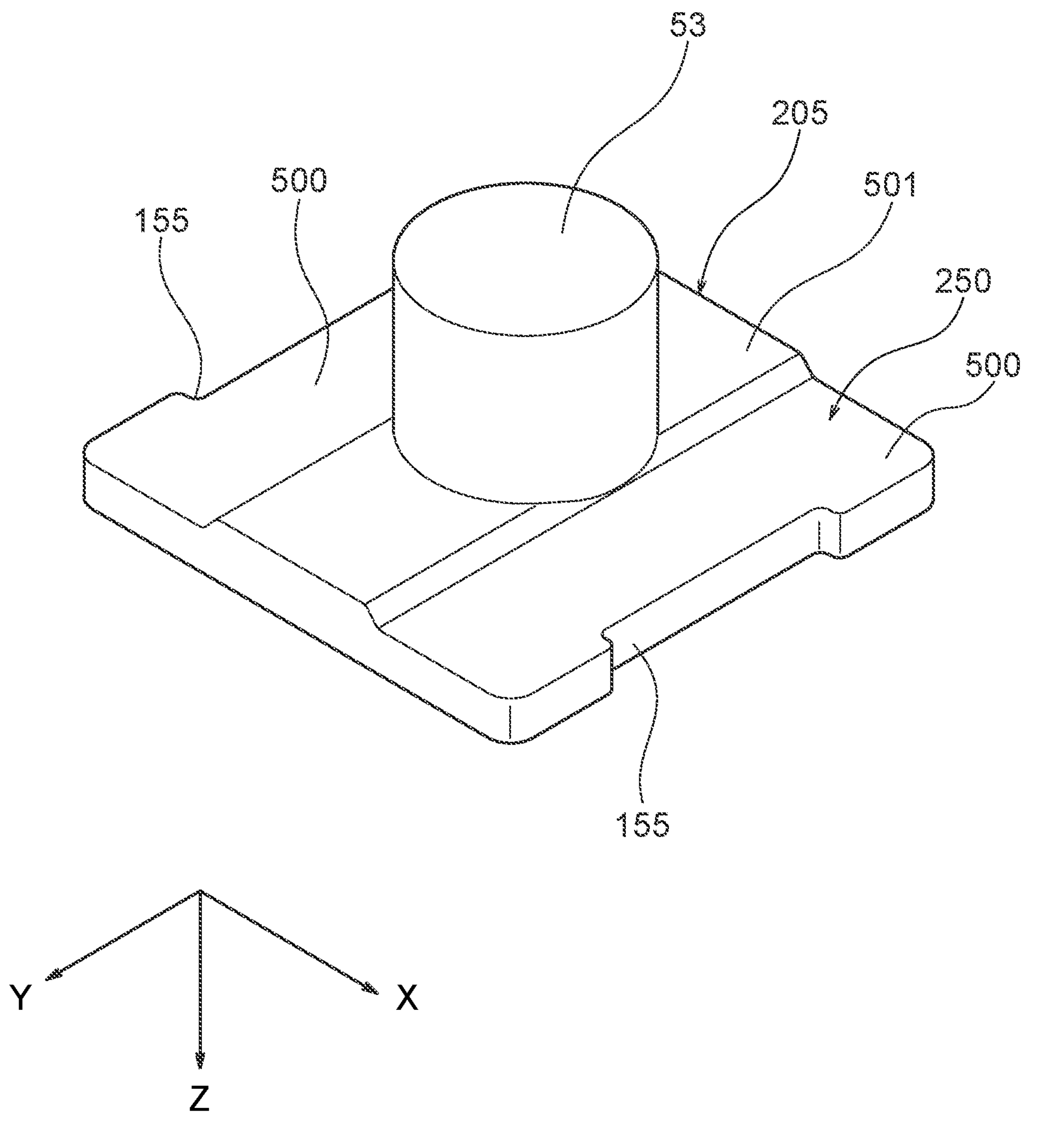
FIG. 13 is a perspective view illustrating the configuration of a first core used in forming an element body of the coil device illustrated in FIG. 12.

As illustrated in FIG. 13, the first core 205 has a base portion 250 instead of the base portion 150 illustrated in FIG. 8. Two step portions 500 and a step upper portion 501 positioned between the step portions 500 are formed on the surface (upper surface) of the base portion 250. The step upper portion 501 forms the upper surface of the step with respect to the step portion 500, and the columnar portion 53 is formed on the step upper portion 501. One of the step portions 500 is formed on the X-axis negative direction side of the base portion 250 with the columnar portion 53 interposed therebetween. The other step portion 500 is formed on the X-axis positive direction side of the base portion 250 with the columnar portion 53 interposed therebetween. The step portions 500 are similar in shape to each other when viewed from the Z-axis direction. Each of the step portions 500 has a substantially rectangular shape having predetermined lengths in the X-axis direction and the Y-axis direction.

Figure 15:
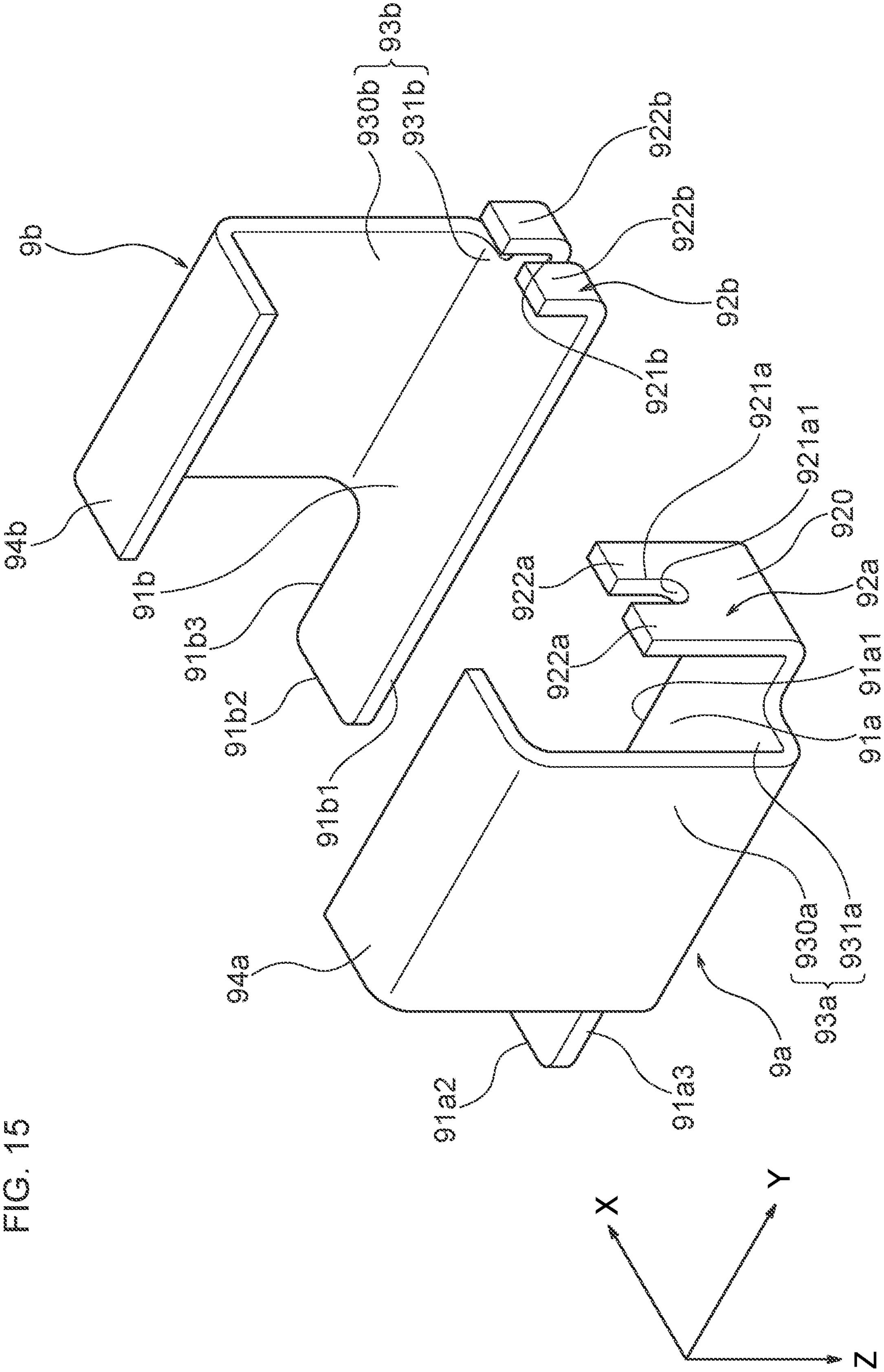
FIG. 15 is a perspective view illustrating the configuration of a pair of terminals illustrated in FIG. 12.

When the inductor 1 is manufactured, terminal base portions 91a and 91b of the terminals 9a and 9b illustrated in FIG. 15 are disposed in the step portions 500. As a result, the terminals 9a and 9b can be positioned with respect to the terminal base portions 91a and 91b at the positions of the step portions 500. In addition, a positional deviation of the terminals 9*a* and 9*b* can be prevented by disposing the terminal base portions 91*a* and 91*b* of the terminals 9*a* and 9*b* in the step portions 500.

Preferably, the depth of the step portion 500 along the Z-axis direction is substantially equal to the thickness of the terminal base portions 91*a* and 91*b* such that the surface (upper surface) of the terminal base portions 91*a* and 91*b* and the surface of the step upper portion 501 are flush with each other when the terminal base portions 91*a* and 91*b* are disposed in the step portions 500.

Connecting portions 93*a* and 93*b* of the terminals 9*a* and 9*b* illustrated in FIG. 15 are disposed in the first recessed portions 155 formed in the side surfaces of the base portion 250 in the X-axis direction. Although the depth of the first recessed portion 155 along the X-axis direction is not particularly limited, the depth is approximately equal to or larger than the thickness of the connecting portions 93*a* and 93*b*.

Figure 14:
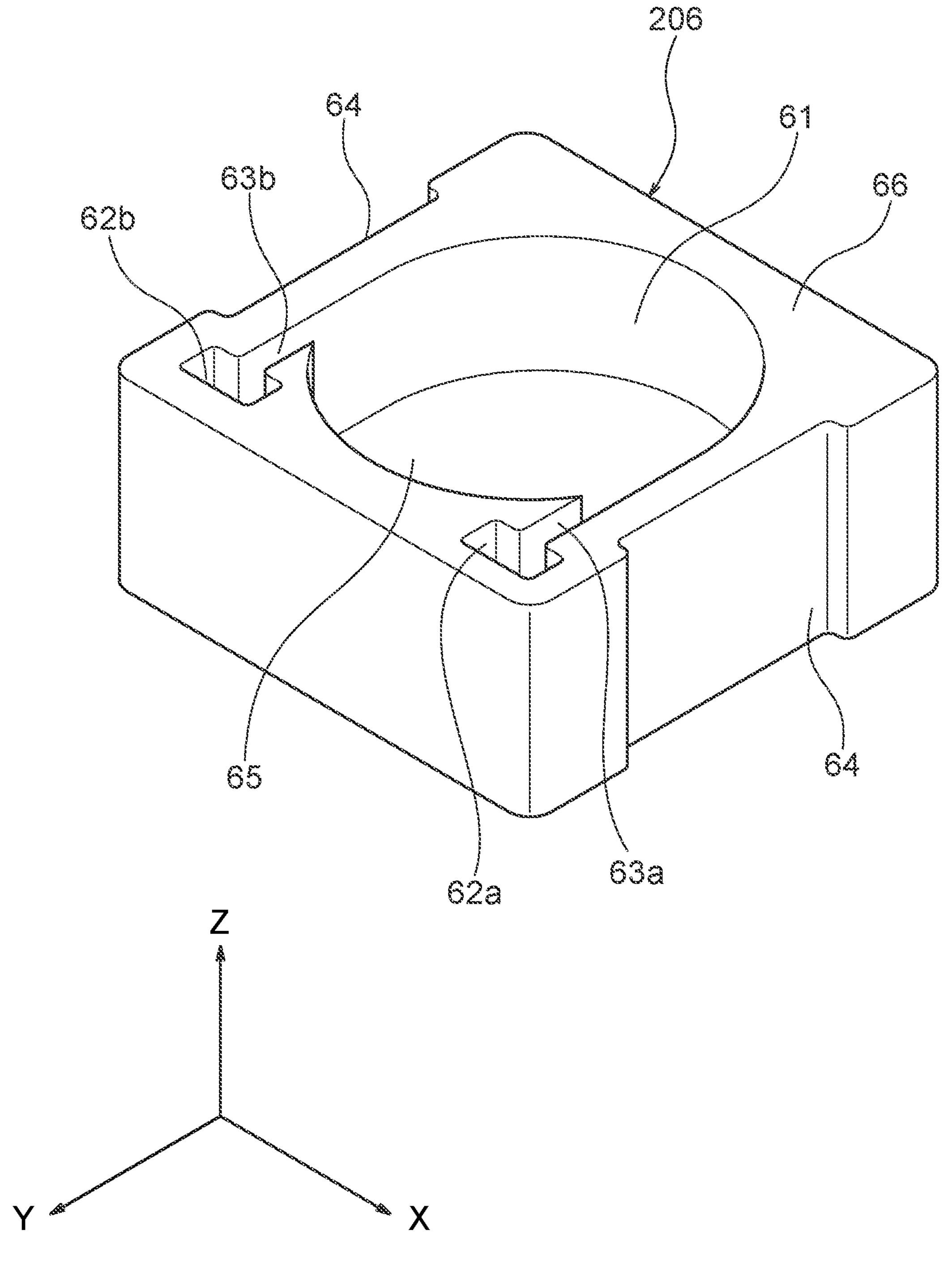
FIG. 14 is a perspective view illustrating the configuration of a second core used in forming the element body of the coil device illustrated in FIG. 12.

As illustrated in FIG. 14, the second core 206 has a substantially quadratic ring shape, is placed on the surface (upper surface) of the first core 205 illustrated in FIG. 13, and is combined with the first core 205 with the coil 202 mounted. The materials constituting the second core 206 and the first core 205 may be identical in type to each other or different in type from each other. The second core 206 has an accommodating hole 61, terminal accommodating grooves 62*a* and 62*b*, connecting grooves 63*a* and 63*b*, a second recessed portion 64, a bottom portion 65, and a main body portion 66.

The main body portion 66 has a bottomed cylindrical shape, and the appearance shape of the main body portion 66 is a substantially rectangular parallelepiped shape. The thickness of the main body portion 66 in the Z-axis direction is larger than the thickness of the base portion 250 illustrated in FIG. 13 in the Z-axis direction. When the first core 205 is combined with the second core 206, the upper surface of the main body portion 66 (surface on the side opposite to the bottom portion 65) is connected to the surface (upper surface) of the base portion 250 of the first core 205. The bottom portion 65 is formed on the lower surface of the main body portion 66.

The accommodating hole 61 is formed substantially at the center of the main body portion 66 and extends from one surface (upper surface) of the main body portion 66 in the Z-axis direction toward the other surface (bottom portion 65). The shape of the opening portion of the accommodating hole 61 is a substantially round shape and substantially matches the outer peripheral shape of the coil 202 illustrated in FIG. 12. The end portion on the side opposite to the opening portion of the accommodating hole 61 is blocked by the bottom portion 65. The accommodating hole 61 accommodates the columnar portion 53 (FIG. 13) of the first core 205 with the coil 202 mounted.

The second recessed portion 64 is formed in each side surface of the main body portion 66 in the X-axis direction. The connecting portions 93*a* and 93*b* of the terminals 9*a* and 9*b* illustrated in FIG. 15 are disposed in the second recessed portions 64. The depth of the second recessed portion 64 along the X-axis direction is almost equal to the depth of the first recessed portion 155 illustrated in FIG. 13 along the X-axis direction. In addition, the width of the second recessed portion 64 in the Y-axis direction is almost equal to the width of the first recessed portion 155 in the Y-axis direction. With the second core 206 combined with the first core 205, the second recessed portion 64 is connected to the first recessed portion 155 along the Z-axis direction. As a result, a lateral recessed portion 80 is formed in each side surface of the core 8 in the X-axis direction so as to extend from one end to the other end in the Z-axis direction as illustrated in FIG. 12.

It should be noted that each second recessed portion 64 extends to the surface (outer surface) of the bottom portion 65 in addition to each side surface of the main body portion 66 in the X-axis direction (not illustrated). In the surface of the bottom portion 65, the second recessed portion 64 extends from the end portion of the bottom portion 65 in the X-axis direction toward the center of the bottom portion 65.

The terminal accommodating groove 62*a* is formed in the corner portion formed at the position where the surface of the main body portion 66 on the Y-axis positive direction side and the surface of the main body portion 66 on the X-axis positive direction side intersect. The terminal accommodating groove 62*b* is formed in the corner portion formed at the position where the surface of the main body portion 66 on the Y-axis positive direction side and the surface of the main body portion 66 on the X-axis negative direction side intersect.

The terminal accommodating grooves 62*a* and 62*b* extend from one surface (upper surface) of the main body portion 66 in the Z-axis direction toward the other surface (bottom portion 65). The shape of the opening portion of the terminal accommodating grooves 62*a* and 62*b* is a substantially rectangular shape. With the second core 206 combined with the first core 205 illustrated in FIG. 13, a connecting wire portion 92*a* in a state of being connected by a molten material 10 illustrated in FIG. 12 can be accommodated in the terminal accommodating groove 62*a*. In addition, a connecting wire portion 92*b* in a state of being connected by the molten material 10 illustrated in FIG. 12 can be accommodated in the terminal accommodating groove 62*b*.

The connecting grooves 63*a* and 63*b* extend from one surface (upper surface) of the main body portion 66 in the Z-axis direction toward the other surface (bottom portion 65). In addition, the connecting grooves 63*a* and 63*b* extend along the Y-axis direction and connect the accommodating hole 61 and the terminal accommodating grooves 62*a* and 62*b*. The connecting groove 63*a* is connected to the end portion of the accommodating hole 61 on the X-axis positive direction side, and the connecting groove 63*b* is connected to the end portion of the accommodating hole 61 on the X-axis negative direction side.

Figure 16A:
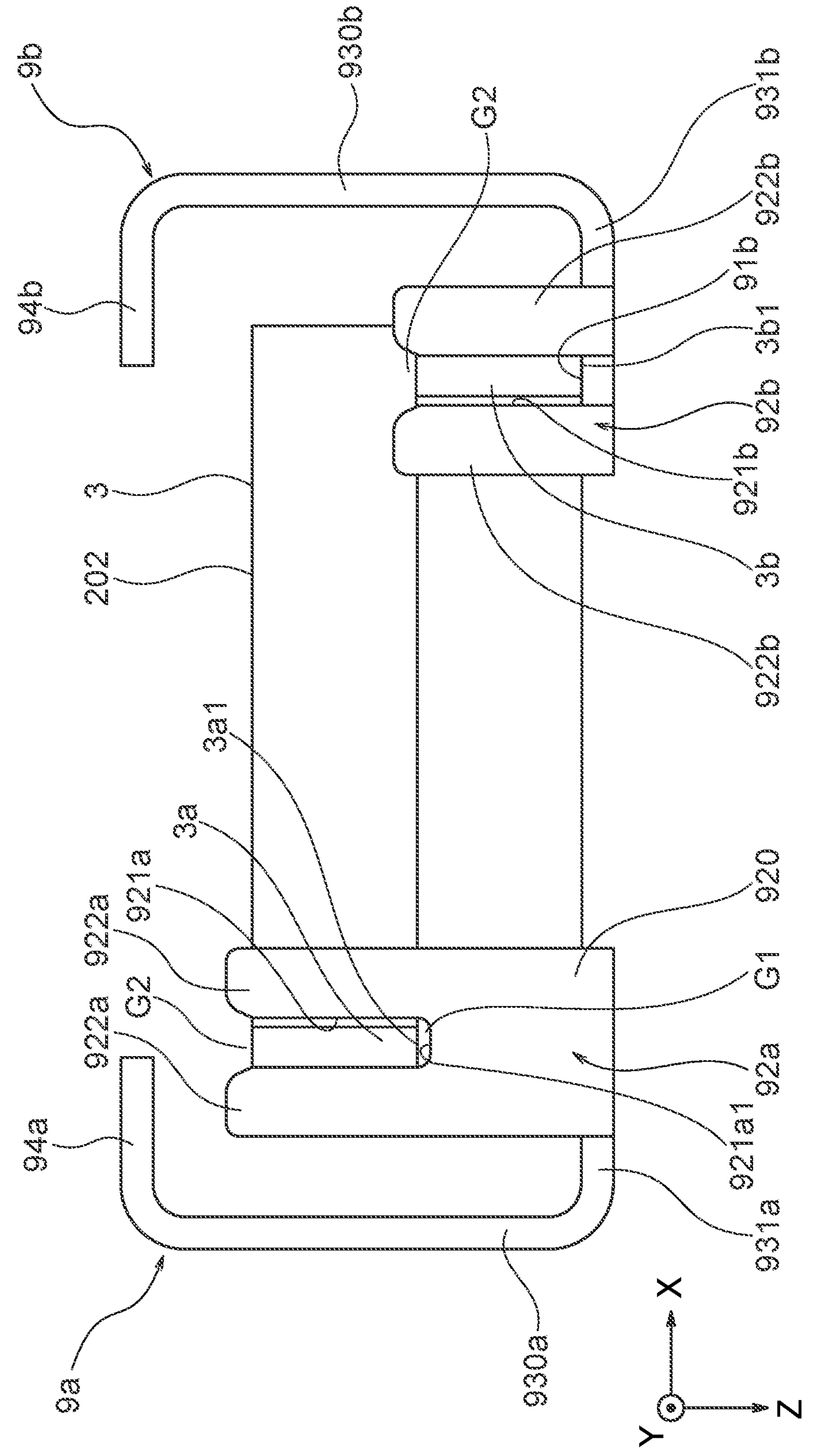
FIG. 16A is a side view illustrating a state at a time when the coil is placed on the base portions of the pair of terminals illustrated in FIG. 15.
Figure 16B:
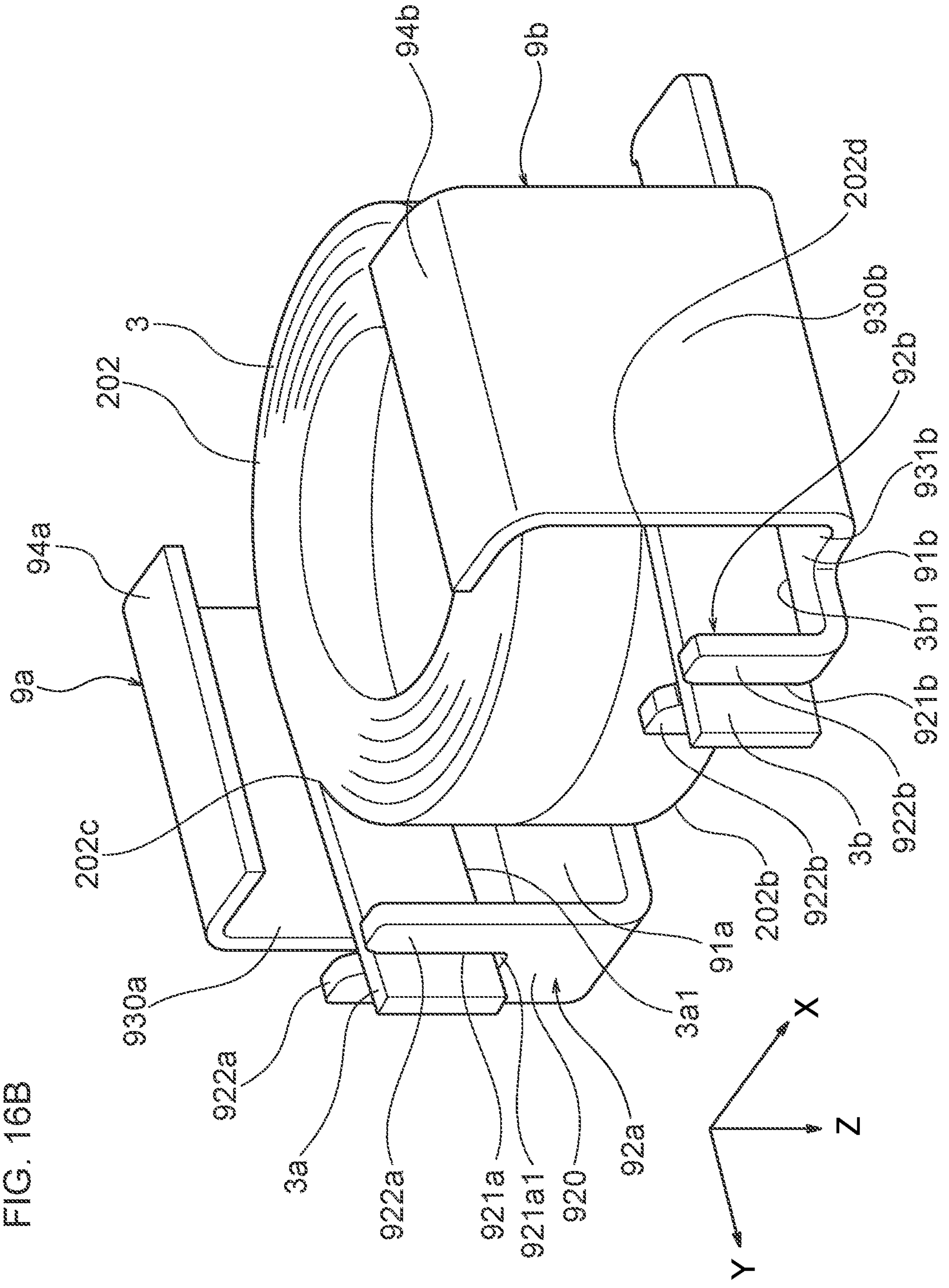
FIG. 16B is a perspective view illustrating a state at a time when the pair of terminals and the coil illustrated in FIG. 16A are viewed from another angle.

As illustrated in FIG. 16B, the pull-out portion 3*a* of the wire 3 is pulled out from a first pull-out position 202*c* of the coil 202 in the second layer (second stage) of the coil 202 and extends linearly along the Y-axis direction. The pull-out portion 3*b* of the wire 3 is pulled out from a second pull-out position 2*d* of the coil 202 in the first layer (first stage) of the coil 202 and extends linearly along the Y-axis direction. The pull-out portions 3*a* and 3*b* are pulled out in the same direction (Y-axis direction) without being twisted. The first pull-out position 202*c* and the second pull-out position 2*d* are positionally deviated along the Z-axis direction, and the pull-out portions 3*a* and 3*b* are disposed so as to be positionally deviated along the Z-axis direction.

As illustrated in FIG. 15, the terminal 9*a* has the terminal base portion 91*a*, the connecting wire portion 92*a*, the connecting portion 93*a*, and a mounting portion 94*a*. The terminal 9*b* has the terminal base portion 91*b*, the connecting wire portion 92*b*, the connecting portion 93*b*, and a mounting portion 94*b*.

The terminal base portions 91*a* and 91*b* have a tabular shape extending in directions substantially orthogonal to the winding axis direction of the coil 202 (that is, the X-axis and Y-axis directions). The terminal base portions 91*a* and 91*b* are disposed in the core 8 illustrated in FIG. 12. The terminal base portions 91*a* and 91*b* have a substantially rectangular shape when viewed from the Z-axis direction. When the inductor 1 is manufactured, the terminal base portions 91*a* and 91*b* are placed in the step portions 500 of the base portion 250 of the first core 205 illustrated in FIG. 13 at a predetermined interval along the X-axis direction.

In a state where the second core 206 illustrated in FIG. 14 is combined with the first core 205 (that is, a state where the core 8 illustrated in FIG. 12 is formed), the terminal base portions 91*a* and 91*b* are disposed at positions separated from an anti-mounting surface 8*b* of the core 8 by the thickness of the step portion 500 in the Z-axis direction.

As illustrated in FIG. 12, the coil 202 is placed on the upper surface of the terminal base portions 91*a* and 91*b*. More specifically, a second end portion 202*b* in the winding axis direction of the coil 202 is installed on the upper surface of the terminal base portions 91*a* and 91*b* and the second end portion 202*b* and the terminal base portions 91*a* and 91*b* come into contact with each other.

Figure 17:
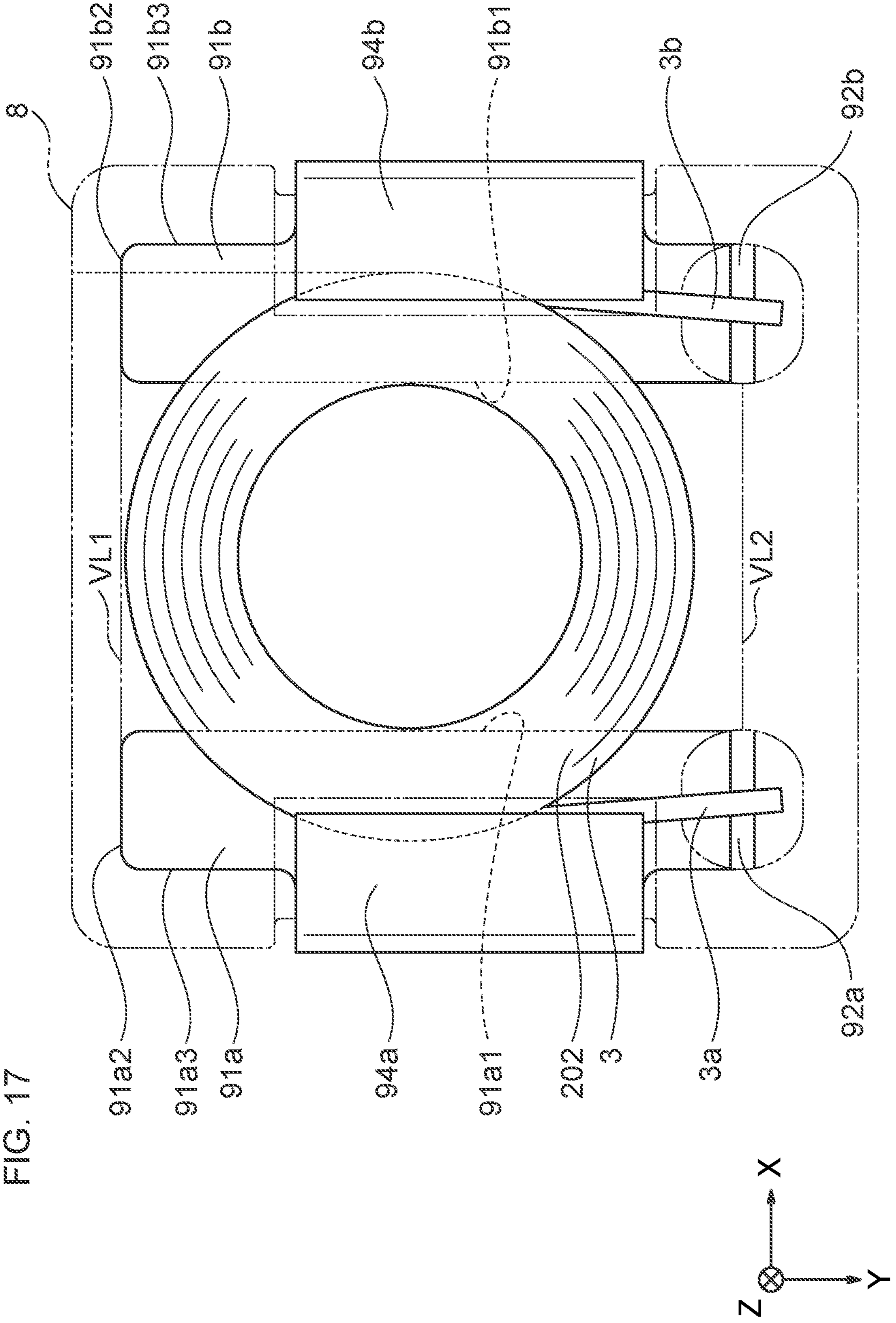
FIG. 17 is a plan view illustrating the configuration of the coil device illustrated in FIG. 12.

As illustrated in FIG. 17, in a state where the second end portion 202*b* of the coil 202 is installed in the terminal base portions 91*a* and 91*b*, inner edge portions 91*a*1 and 91*b*1 of the terminal base portions 91*a* and 91*b* are positioned between the outer peripheral surface and the inner peripheral surface of the coil 202. With such a configuration, the second end portion 202*b* of the coil 202 can be disposed in a stable state in the terminal base portions 91*a* and 91*b*. In addition, the inner edge portions 91*a*1 and 91*b*1 of the terminal base portions 91*a* and 91*b* are not disposed in the passage of the magnetic flux passing through the inner peripheral side of the coil 202, and thus the passage of the magnetic flux is ensured satisfactorily and the inductor 1 having satisfactory inductance characteristics can be realized.

In a state where the coil 202 is placed in the terminal base portions 91*a* and 91*b*, the outer peripheral surface of the coil 202 is disposed inside a virtual line VL1, which connects a lateral edge portion 91*a*2 of the terminal base portion 91*a* and a lateral edge portion 91*b*2 of the terminal base portion 91*b* in the X-axis direction, in the Y-axis direction. By placing the coil 202 in the terminal base portions 91*a* and 91*b* such that the outer peripheral surface of the coil 202 is not disposed outside the virtual line VL1 in the Y-axis direction, the outer peripheral surface of the coil 202 can be disposed at a position sufficiently separated from the side surface of the core 8 on the Y-axis negative direction side, the thickness of the core 8 can be sufficiently ensured between the outer peripheral surface of the coil 202 (end portion of the coil 202 on the Y-axis negative direction side) and the side surface of the core 8 on the Y-axis negative direction side, and cracking of the side surface of the core 8 on the Y-axis negative direction side can be prevented.

As illustrated in FIG. 16B, a part of the pull-out portion 3*b* of the wire 3 is placed on the upper surface of the terminal base portion 91*b* together with the second end portion 202*b* of the coil 202. More specifically, a pull-out bottom portion 3*b*1 of the pull-out portion 3*b* is installed on the upper surface of the terminal base portion 91*b* and the pull-out bottom portion 3*b*1 and the terminal base portion 91*b* come into contact with each other. As a result, the pull-out bottom portion 3*b*1 of the pull-out portion 3*b* is supported by the terminal base portion 91*b*1.

The pull-out portions 3*a* and 3*b* of the wire 3 are connected to the connecting wire portions 92*a* and 92*b*. As illustrated in FIG. 12, the connecting wire portions 92*a* and 92*b* are disposed in the core 8. In the present embodiment, the pull-out portions 3*a* and 3*b* are pulled out toward substantially the same direction (Y-axis positive direction side), and thus the connecting wire portions 92*a* and 92*b* are disposed on the Y-axis positive direction side of the coil 202 where the pull-out portions 3*a* and 3*b* are pulled out.

As illustrated in FIG. 15, the connecting wire portions 92*a* and 92*b* are raised along the Z-axis direction from the terminal base portions 91*a* and 91*b*. More specifically, the connecting wire portions 92*a* and 92*b* are raised from the end portions of the terminal base portions 91*a* and 91*b* on the Y-axis positive direction side (end portions positioned on the side opposite to the lateral edge portions 91*a*2 and 91*b*2) in a state of being substantially orthogonal to the terminal base portions 91*a* and 91*b* and extend along the Z-axis direction. The rising positions of the connecting wire portions 92*a* and 92*b* are positioned outside the positions of the end portions of the connecting portions 93*a* and 93*b* on the Y-axis positive direction side in the Y-axis direction. The first connecting wire portion 92*a* and the second connecting wire portion 92*b* extend along the Z-axis direction at different positions in the X-axis direction so as to be substantially parallel to each other.

As illustrated in FIG. 17, in a state where the coil 202 is placed in the terminal base portions 91*a* and 91*b*, the outer peripheral surface of the coil 202 is not exposed outside a virtual line VL2, which connects the first connecting wire portion 92*a* and the second connecting wire portion 92*b* in the X-axis direction, in the Y-axis direction and is disposed inside the virtual line VL2 in the Y-axis direction. With such a configuration, the outer peripheral surface of the coil 202 can be disposed at a position sufficiently separated from the side surface of the core 8 on the Y-axis positive direction side, the thickness of the core 8 can be sufficiently ensured between the outer peripheral surface of the coil 202 (end portion of the coil 202 on the Y-axis positive direction side) and the side surface of the core 8 on the Y-axis positive direction side, and cracking of the side surface of the core 8 on the Y-axis positive direction side can be prevented.

As illustrated in FIG. 15, the connecting wire portion 92*a* has a tabular portion 920, an accommodating recessed portion 921*a*, and a pair of protruding portions 922*a* and 922*a*. In addition, the connecting wire portion 92*b* has an accommodating recessed portion 921*b* and a pair of protruding portions 922*b* and 922*b*.

The tabular portion 920 has a tabular shape parallel to the XZ plane and extends along the Z-axis direction in a state of being substantially orthogonal to the terminal base portion 91*a*. The tabular portion 920 is provided only in the connecting wire portion 92*a* and is not provided in the connecting wire portion 92*b*.

As illustrated in FIG. 16B, the pull-out portion 3*a* of the wire 3 is accommodated in the accommodating recessed portion 921*a*. The accommodating recessed portion 921*a* is formed of a notch formed along the Z-axis direction in the top portion of the connecting wire portion 92*a*. One end (upper end) of the accommodating recessed portion 921*a* in the Z-axis direction is open. The pull-out portion 3*a* of the wire 3 can be inserted into the accommodating recessed portion 921*a* by being inserted (or slid) from the open part.

As illustrated in FIG. 16A, when the pull-out portion 3*a* of the wire 3 is accommodated in the accommodating recessed portion 921*a*, a gap G1 is formed between a pull-out bottom portion 3*a*1 of the pull-out portion 3*a* and an accommodating bottom portion 921*a*1 of the accommodating recessed portion 921*a*. In this case, the pull-out portion 3*a* of the wire 3 accommodated in the accommodating recessed portion 921*a* is positioned above the accommodating bottom portion 921_a_1 of the accommodating recessed portion 921_a_ by the distance corresponding to the length of the gap G1 in the Z-axis direction.

Accordingly, the pull-out portion 3_a_ that is linearly pulled out can be connected to the connecting wire portion 92_a_ without being bent in accommodating the pull-out portion 3_a_ in the accommodating recessed portion 921_a_ even in a case where, for example, the first pull-out position 202_c_ (FIG. 16B) of the pull-out portion 3_a_ is deviated in the Z-axis direction (downward on the Z axis in particular) due to a manufacturing error.

In addition, the pull-out portion 3_a_ can be reliably accommodated in the accommodating recessed portion 921_a_ without tilting the coil 202 by making the depth of the accommodating recessed portion 921_a_ relatively deep in advance such that the gap (margin) G1 is formed between the pull-out portion 3_a_ and the accommodating bottom portion 921_a_1 of the accommodating recessed portion 921_a_. In addition, the pull-out portion 3_a_ can be reliably accommodated in the accommodating recessed portion 921_a_ even in a case where the first pull-out position 202_c_ (FIG. 16B) of the pull-out portion 3_a_ should be disposed at an unusual position along the Z-axis direction due to, for example, a change in design.

It should be noted that a gap G2 is formed between the end portion of the pull-out portion 3_a_ on the side opposite to the pull-out bottom portion 3_a_1 and the top portion of the connecting wire portion 92_a_ in the Z-axis direction. Although the length of the gap G2 in the Z-axis direction is larger than the length of the gap G1 in the Z-axis direction, the length of the gap G2 in the Z-axis direction may be smaller than the length of the gap G1 in the Z-axis direction.

The pair of protruding portions 922_a_ and 922_a_ are formed with the accommodating recessed portion 921_a_ interposed therebetween. The extension direction of the protruding portions 922_a_ and 922_a_ is the same as the extension direction of the tabular portion 920 and is the Z-axis direction. The length of the protruding portions 922_a_ and 922_a_ along the Z-axis direction corresponds to the length of the accommodating recessed portion 921_a_ along the Z-axis direction.

As illustrated in FIG. 16B, the pull-out portion 3_b_ of the wire 3 is accommodated in the accommodating recessed portion 921_b_. The accommodating recessed portion 921_b_ is formed of a notch formed along the Z-axis direction in the top portion of the connecting wire portion 92_b_. However, a part (the bottom portion) of the accommodating recessed portion 921_b_ bites into the end portion of the terminal base portion 91_b_ on the Y-axis positive direction side. Strictly speaking, a part of the accommodating recessed portion 921_b_ is formed along the Y-axis direction in the terminal base portion 91_b_. By the accommodating recessed portion 921_b_ being formed so as to extend to the terminal base portion 91_b_ in this manner, the pair of protruding portions 922_b_ and 922_b_ (described later) can be easily folded (raised) along the Z axis at the intersection of the terminal base portion 91_b_ and the connecting wire portion 92_b_.

One end (upper end) of the accommodating recessed portion 921_b_ in the Z-axis direction is open. The pull-out portion 3_b_ of the wire 3 can be inserted into the accommodating recessed portion 921_b_ by being inserted (or slid) from the open part. In a state where the pull-out portion 3_b_ is accommodated in the accommodating recessed portion 921_b_, the pull-out bottom portion 3_b_1 of the pull-out portion 3_b_ is placed on the upper surface of the terminal base portion 91_b_ and the pull-out bottom portion 3_b_1 and the upper surface of the terminal base portion 91_b_ are in contact with each other.

The pair of protruding portions 922_b_ and 922_b_ are formed with the accommodating recessed portion 921_b_ interposed therebetween. The extension direction of the protruding portions 922_b_ and 922_b_ is the same as the extension direction of the protruding portions 922_a_ and 922_a_ and is the Z-axis direction.

As illustrated in FIG. 16A, the accommodating recessed portion 921_a_ and the accommodating recessed portion 921_b_ are positionally deviated along the Z-axis direction. In addition, the position of the pull-out portion 3_a_ accommodated in the accommodating recessed portion 921_a_ in the Z-axis direction and the position of the pull-out portion 3_b_ accommodated in the accommodating recessed portion 921_b_ in the Z-axis direction are positionally deviated.

In the present embodiment, the pull-out portion 3_a_ and the pull-out portion 3_b_ are pulled out from the coil 202 in a state of being positionally deviated along the Z-axis direction. Accordingly, the connecting wire portions 92_a_ and 92_b_ are formed such that the accommodating recessed portion 921_a_ and the accommodating recessed portion 921_b_ are positionally deviated along the Z-axis direction in a form corresponding thereto. The positional deviation width between the accommodating recessed portion 921_a_ and the accommodating recessed portion 921_b_ along the Z-axis direction corresponds to the distance between the pull-out position 202_c_ (FIG. 16B) of the pull-out portion 3_a_ and a pull-out position 202_d_ (FIG. 16B) of the pull-out portion 3_b_ along the Z-axis direction. The positional deviation width between the accommodating recessed portion 921_a_ and the accommodating recessed portion 921_b_ along the Z-axis direction may correspond to the width of the wire 3 (pull-out portions 3_a_ and 3_b_) along the Z-axis direction.

In addition, the positional deviation width between the accommodating recessed portion 921_a_ and the accommodating recessed portion 921_b_ along the Z-axis direction may correspond to the distance between the tip portion of the pair of protruding portions 922_a_ and 922_a_ and the tip portion of pair of protruding portions 922_b_ and 922_b_. In addition, the positional deviation width between the accommodating recessed portion 921_a_ and the accommodating recessed portion 921_b_ along the Z-axis direction may correspond to the distance between the accommodating bottom portion 921_a_1 of the accommodating recessed portion 921_a_ and the upper surface of the terminal base portion 91_b_. In addition, the positional deviation width between the accommodating recessed portion 921_a_ and the accommodating recessed portion 921_b_ along the Z-axis direction may correspond to the length of the tabular portion 920 of the connecting wire portion 92_a_ along the Z-axis direction.

When the connecting wire portions 92_a_ and 92_b_ are viewed from the front (Y-axis positive direction side), the accommodating recessed portions 921_a_ and 921_b_ are disposed inside the position of the outer periphery of the coil 202 in the X-axis direction as illustrated in FIGS. 16A and 17. In other words, the distance between the accommodating recessed portion 921_a_ and the accommodating recessed portion 921_b_ is smaller than the outer diameter of the coil 202. In addition, the distance is smaller than the distance between the first pull-out position 202_c_ (FIG. 16B) of the pull-out portion 3_a_ of the wire 3 and the second pull-out position 202_d_ (FIG. 16B) of the pull-out portion 3_b_ and the accommodating recessed portion 921_a_ and the accommodating recessed portion 921_b_ are disposed between the first pull-out position 202_c_ and the second pull-out position 202_d_. Accordingly, as illustrated in FIG. 17, the pull-out portions 3_a_ and 3_b_ are accommodated in the accommodating recessed portions 921*a* and 921*b* in a state of being inclined inward by a predetermined angle with respect to the Y-axis direction and pulled out.

Laser irradiation is performed on the connecting wire portions 92*a* and 92*b* with the pull-out portions 3*a* and 3*b* of the wire 3 accommodated in the accommodating recessed portions 921*a* and 921*b*. Then, the molten material (a joining portion or member) 10 made of a welding ball or the like is formed in the connecting wire portions 92*a* and 92*b* as illustrated in FIG. 12. As a result, each of the pair of protruding portions 922*a* and 922*a* illustrated in FIG. 15 is connected by the molten material 10 and each of the pair of protruding portions 922*b* and 922*b* is connected by the molten material 10.

As illustrated in FIG. 15, the connecting portions 93*a* and 93*b* are raised along the Z-axis direction at positions different from those of the connecting wire portions 92*a* and 92*b* in the terminal base portions 91*a* and 91*b*. The connecting portions 93*a* and 93*b* are raised from outer edge portions 91*a*3 and 91*b*3 on the side opposite to the inner edge portions 91*a*1 and 91*b*1 of the terminal base portions 91*a* and 91*b* in the X-axis direction.

The connecting portions 93*a* and 93*b* have mounting auxiliary portions 930*a* and 930*b* and lateral pull-out portions 931*a* and 931*b*. The lateral pull-out portions 931*a* and 931*b* are connected to the outer edge portions 91*a*3 and 91*b*3 of the terminal base portions 91*a* and 91*b*. The lateral pull-out portions 931*a* and 931*b* have a surface parallel to the XY plane and extend outward in the X-axis direction to the positions of the side surfaces of the core 8 in the X-axis direction.

The mounting auxiliary portions 930*a* and 930*b* are connected to the end portions of the lateral pull-out portions 931*a* and 931*b* in the X-axis direction and extend upward. The mounting auxiliary portions 930*a* and 930*b* have a surface parallel to the YZ plane and extend along the side surfaces of the core 8 illustrated in FIG. 12 in the X-axis direction to the position of a mounting surface 8*a* of the core 8. It should be noted that the mounting auxiliary portions 930*a* and 930*b* are exposed to the outside of the core 8.

The mounting portions 94*a* and 94*b* are connected to the end portions of the mounting auxiliary portions 930*a* and 930*b* in the Z-axis direction and extend inward in the X-axis direction. The mounting portions 94*a* and 94*b* have a surface parallel to the XY plane and are formed along the mounting surface 8*a* of the core 8 illustrated in FIG. 12. The mounting portions 94*a* and 94*b* are exposed to the outside of the core 8 on the mounting surface 8*a* and constitute a connecting portion in relation to a circuit board or the like (not illustrated) when the inductor 1 is mounted.

When an inductor 21 in the present embodiment is manufactured, the second end portion 202*b* of the coil 202 illustrated in FIG. 12 is placed first on the upper surface of the terminal base portions 91*a* and 91*b* of the terminals 9*a* and 9*b* illustrated in FIG. 15. In addition, the pull-out portions 3*a* and 3*b* of the wire 3 are accommodated in the accommodating recessed portions 921*a* and 921*b* of the connecting wire portions 92*a* and 92*b* illustrated in FIG. 15, laser irradiation is performed on the connecting wire portions 92*a* and 92*b*, and the pull-out portions 3*a* and 3*b* are connected to the terminals 9*a* and 9*b* via the molten material 10 (FIG. 12). Next, with the terminals 9*a* and 9*b* fixed to the respective end portions, the coil 2 is installed in a mold and the first core 205 illustrated in FIG. 13 and the second core 206 illustrated in FIG. 14 are combined with the coil 2.

More specifically, in a state where the coil 202 illustrated in FIG. 16B is installed, the terminal base portions 91*a* and 91*b* of the terminals 9*a* and 9*b* are placed in the step portions 500 of the base portion 250 of the first core 205 illustrated in FIG. 13. At this time, the columnar portion 53 of the first core 205 illustrated in FIG. 13 is inserted through the coil 202 and the columnar portion 53 is disposed in the coil 202. Then, in that state, the second core 206 is combined with the first core 205 such that the columnar portion 53 illustrated in FIG. 13 and the coil 202 attached to the columnar portion 53 illustrated in FIG. 13 are accommodated in the accommodating hole 61 of the second core 206 illustrated in FIG. 14 and the first core 205 and the second core 206 are compression-molded in the mold. As a result, the first core 205 and the second core 206 are integrated and the core 8 illustrated in FIG. 12 is formed.

It should be noted that methods for manufacturing the inductor 21 are not limited thereto. For example, the order in which the coil 202 is placed in the terminal base portions 91*a* and 91*b* of the terminals 9*a* and 9*b* may be changed. More specifically, the second end portion 202*b* of the coil 202 may be placed on the upper surface of the terminal base portions 91*a* and 91*b* after the terminal base portions 91*a* and 91*b* of the terminals 9*a* and 9*b* illustrated in FIG. 15 are placed in the step portions 500 of the base portion 250 of the first core 205 illustrated in FIG. 13.

As illustrated in FIG. 12, in the coil device 201 according to the present embodiment, the terminals 9*a* and 9*b* have the terminal base portions 91*a* and 91*b* where the second end portion 202*b* of the coil 202 is installed. Accordingly, when the inductor 201 is manufactured, the coil 202 and the terminals 9*a* and 9*b* can be installed together in the mold with the second end portion 202*b* of the coil 202 placed in the terminal base portions 91*a* and 91*b*. By placing the second end portion 202*b* of the coil 202 in the terminal base portions 91*a* and 91*b* in this manner, the second end portion 202*b* of the coil 202 is supported by the terminal base portions 91*a* and 91*b*, and thus the coil 202 is unlikely to positionally deviate in the Z-axis direction and the position of the second end portion 202*b* of the coil 202 is fixed to the positions of the terminal base portions 91*a* and 91*b* even if a pressurizing force acts on the coil 202 during the compression molding of the first core 205 (FIG. 13) and the second core 206 (FIG. 14). Accordingly, the position of the coil 202 can be set to a predetermined position (the upper surface of the terminal base portions 91*a* and 91*b*) in the core 8, unevenness between products in inductance characteristics or the like attributable to unevenness in the position of the coil 202 can be prevented, and the highly reliable inductor 201 can be realized.

In addition, in the inductor 201 according to the present embodiment, the accommodating recessed portions 921*a* and 921*b* where the pull-out portions 3*a* and 3*b* are accommodated are formed in the connecting wire portions 92*a* and 92*b* as illustrated in FIGS. 15 and 16B. Accordingly, by accommodating the pull-out portions 3*a* and 3*b* in the accommodating recessed portions 921*a* and 921*b*, the pull-out portions 3*a* and 3*b* can be connected to the connecting wire portions 92*a* and 92*b*, there is no need to crimp the terminals 9*a* and 9*b* with respect to the pull-out portions 3*a* and 3*b* in connecting the pull-out portions 3*a* and 3*b* to the connecting wire portions 92*a* and 92*b*, and the pull-out portions 3*a* and 3*b* can be easily connected to the terminals 9*a* and 9*b*.

In the inductor 201 according to the present embodiment in particular, the accommodating recessed portion 921*a* and the accommodating recessed portion 921*b* are positionally deviated along the Z-axis direction. Accordingly, even if the first pull-out position 202*c* (FIG. 16B) of the pull-out portion 3*a* and the second pull-out position 202*d* (FIG. 16B) of the pull-out portion 3*b* are positionally deviated along the Z-axis direction, the pull-out portions 3*a* and 3*b* can be respectively pulled out to the terminals 9*a* and 9*b* without unnecessarily bending the pull-out portion 3*a* or the pull-out portion 3*b*. Accordingly, also in this regard, the pull-out portions 3*a* and 3*b* can be easily connected to the terminals 9*a* and 9*b*.

In addition, in the inductor 201 according to the present embodiment, the connecting wire portions 92*a* and 92*b* where the accommodating recessed portions 921*a* and 921*b* are formed are disposed in the core 8 and a flat wire constitutes the coil 202. Accordingly, the pull-out portions 3*a* and 3*b* can be easily connected to the terminals 9*a* and 9*b* as described above and the surface mounting-type inductor 201 capable of allowing a large current to flow can be easily manufactured.

It should be noted that the present invention is not limited to the embodiments described above and can be variously modified within the scope of the present invention.

Although an application example regarding the inductor of the present invention has been illustrated in each of the embodiments described above, the present invention may be applied to a coil device other than the inductor.

Although the winding shape of the wire 3 is a round spiral shape in each of the embodiments described above, the shape may be, for example, an elliptical spiral shape, a square spiral shape, or the like.

Although a flat wire constitutes the wire 3 in the first embodiment described above, the wire 3 may be constituted by a round wire, a quadratic wire, or a litz wire. The same applies to the second embodiment.

In the first embodiment described above, the connecting wire portion 45 of the terminal 4*a* and the connecting wire portion 45 of the terminal 4*b* may be disposed diagonally with the coil 2 interposed therebetween. The same applies to the second embodiment.

In the first embodiment described above, the base portion 50 may have a flat upper surface with the recessed portions 51*a* to 51*d*, the projecting portions 52*a* to 52*d*, and the protruding portion 54 omitted from the base portion 50.

In the first embodiment described above, a part of the upper surface or the side surface of the first core 5 may be covered with the second core 6. The same applies to the second embodiment.

In the first embodiment described above, the connecting portion 47 of the terminals 4*a* and 4*b* may be folded toward the first core 5 side. The same applies to the second embodiment.

EXPLANATIONS OF LETTERS OR NUMERALS

1, 101, 201 INDUCTOR (COIL DEVICE)
2, 102, 202 COIL
202*b* SECOND END PORTION WIRE
3*a*, 3*b* WIRE END
4*a*, 4*b*, 104*a*, 104*b* TERMINAL
41 FIRST PLACEMENT PORTION
42 SECOND PLACEMENT PORTION
43 FIRST POSITIONING PORTION
44 SECOND POSITIONING PORTION
45, 145 CONNECTING WIRE PORTION
45*a*, 145*a* FIXED PIECE
45*b*, 145*b* FOLDED PIECE
46 MOUNTING PORTION
47 CONNECTING PORTION
48 NOTCH PORTION
149 FIXING HOLE
5, 105, 205 FIRST CORE
50, 150, 250 BASE PORTION
51*a* TO 51*d* FIRST RECESSED PORTION TO FOURTH RECESSED PORTION
52*a* TO 52*d* FIRST PROJECTING PORTION TO FOURTH PROJECTING PORTION
53 COLUMNAR PORTION
54 PROTRUDING PORTION
155 RECESSED PORTION
500 STEP PORTION
501 STEP UPPER PORTION
6, 206 SECOND CORE
61 ACCOMMODATING HOLE
62*a*, 62*b* TERMINAL ACCOMMODATING GROOVE
63*a*, 63*b* CONNECTING GROOVE
64 SECOND RECESSED PORTION
65 BOTTOM PORTION
66 MAIN BODY PORTION
7 FRAME
8 CORE
8*a* MOUNTING SURFACE
8*b* ANTI-MOUNTING SURFACE
80 LATERAL RECESSED PORTION
9*a*, 9*b* TERMINAL
91*a*, 91*b* TERMINAL BASE PORTION
91*a*1, 91*b*1 INNER EDGE PORTION
91*a*2, 91*b*2 LATERAL EDGE PORTION
91*a*3, 91*b*3 OUTER EDGE PORTION
92*a*, 92*b* CONNECTING WIRE PORTION
920 TABULAR PORTION
921*a*, 921*b* ACCOMMODATING RECESSED PORTION
921*a*1 ACCOMMODATING BOTTOM PORTION
922*a*, 922*b* PROTRUDING PORTION
93*a*, 93*b* CONNECTING PORTION
930*a*, 930*b* MOUNTING AUXILIARY PORTION
931*a*, 931*b* LATERAL PULL-OUT PORTION
94*a*, 94*b* MOUNTING PORTION
10 MOLTEN MATERIAL

What is claimed is:

1. A coil device comprising:
a coil;
a first terminal having a first connecting wire portion connected to a first end portion of the coil;
a second terminal having a second connecting wire portion connected to a second end portion of the coil;
a first core having a columnar portion and a base portion, a coil being disposed around the columnar portion, the base portion having an upper surface provided with the columnar portion; and
a second core covering the upper surface of the base portion together with the coil,
wherein the first terminal has a first terminal base portion directly disposed on the upper surface of the base portion and covered by the second core-, a first connecting portion continuous to the first terminal base portion and extending in a protruding direction of the columnar portion along a first side surface of the second core, and a first mounting portion continuous to the first connecting portion and disposed along a mounting surface of the second core, and the first connecting wire portion bending to the first terminal base portion and covered by the second core, and
the second terminal has a second terminal base portion directly disposed on the upper surface of the base portion and covered by the second core, a second connecting portion continuous to the second terminal base portion and extending in the protruding direction of the columnar portion along a second side surface of the second core, and a second mounting portion continuous to the second connecting portion and disposed along the mounting surface of the second core, and the second connecting wire portion bending to the second terminal base portion and covered by the second core.

2. The coil device according to claim 1, wherein the first connecting wire portion is disposed on the first core and the second core is disposed on the first connecting wire portion.

3. The coil device according to claim 1, wherein the first core and the second core are joined on substantially the same plane.

4. The coil device according to claim 2, wherein the first core and the second core are joined on substantially the same plane.

5. The coil device according to claim 1, wherein the first connecting wire portion and the coil are disposed on substantially the same plane of the base portion.

6. The coil device according to claim 2, wherein the first connecting wire portion and the coil are disposed n substantially the same plane of the base portion.

7. The coil device according to claim 1, wherein the first terminal base portion is disposed on a different position from a contact surface between the base portion and the coil.

8. The coil device according to claim 2, wherein the first terminal base portion is disposed on a different position from a contact surface between the base portion and the coil.

9. The coil device according to claim 1, wherein a notch is formed in the first terminal at least at a position where the first terminal is exposed to outer sides of the first core and the second core.

10. The coil device according to claim 1, wherein the first connecting wire portion and the second connecting wire portion are disposed so as to be oriented in the same direction.

11. The coil device according to claim 1, wherein the columnar portion is not at a central portion of the base portion.

12. The coil device according to claim 1, wherein the first core has an anti-mounting surface facing to the mounting surface of the second core.

* * * * *